(12) United States Patent
Eom et al.

(10) Patent No.: US 11,493,166 B2
(45) Date of Patent: Nov. 8, 2022

(54) REFRIGERATOR

(71) Applicant: SAMSUNG ELECTRONICS CO., LTD., Suwon-si (KR)

(72) Inventors: Taein Eom, Suwon-si (KR); Hyunuk Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/080,011

(22) Filed: Oct. 26, 2020

(65) Prior Publication Data

US 2021/0123657 A1  Apr. 29, 2021

(30) Foreign Application Priority Data

Oct. 28, 2019 (KR) ........................ 10-2019-0134339

(51) Int. Cl.
*F16M 11/04* (2006.01)
*F16M 13/02* (2006.01)
*F16M 11/10* (2006.01)

(52) U.S. Cl.
CPC ......... *F16M 11/046* (2013.01); *F16M 11/105* (2013.01); *F16M 13/02* (2013.01); *F25D 2400/36* (2013.01); *F25D 2400/361* (2013.01)

(58) Field of Classification Search
USPC ..... 62/126, 125, 131, 246; 312/405.01, 405; 361/679.21, 724–727; 345/87; 248/309.1, 317, 323, 327, 917, 918, 919, 248/295.11, 297.31
See application file for complete search history.

(56) References Cited

U.S. PATENT DOCUMENTS

| | | | |
|---|---|---|---|
| 8,035,958 B2 | 10/2011 | Kendall et al. | |
| 2005/0205725 A1 | 9/2005 | Yokouchi et al. | |
| 2006/0261220 A1* | 11/2006 | Lee ........................ | F16M 11/10 312/401 |
| 2011/0058322 A1 | 3/2011 | Lee et al. | |

(Continued)

FOREIGN PATENT DOCUMENTS

| | | |
|---|---|---|
| CN | 201487494 U | 5/2010 |
| JP | 4402448 | 11/2009 |
| KR | 10-0415816 | 1/2004 |

(Continued)

OTHER PUBLICATIONS

International Search Report dated Feb. 24, 2021 in Corresponding International Application No. PCT/KR2020/014542.

(Continued)

*Primary Examiner* — Alfred J Wujciak
(74) *Attorney, Agent, or Firm* — Staas & Halsey LLP

(57) ABSTRACT

Disclosed is a refrigerator including a main body, a door coupled to a front surface of the main body, a bracket coupled to a front surface of the door and including a roller, a sliding plate supported on the roller and fixed to the bracket to slide in a vertical direction, a display supported on the sliding plate, and a position fixing device configured to fix a position of the sliding plate, wherein the position fixing device includes a spur gear rotatably provided on the bracket, a rack gear provided on the sliding plate and engaged with the spur gear, and a stopper configured to prevent rotation of the spur gear when the sliding plate is stopped to fix the position of the sliding plate.

20 Claims, 23 Drawing Sheets

(56) References Cited

U.S. PATENT DOCUMENTS

2020/0378679 A1* 12/2020 Lee .................. F25D 29/003

FOREIGN PATENT DOCUMENTS

| KR | 10-2004-0085756 | 10/2004 |
| KR | 10-2004-0085760 | 10/2004 |
| KR | 10-0608939 B1 | 8/2006 |
| KR | 10-0826605 B1 | 4/2008 |
| KR | 10-1164820 | 7/2012 |
| WO | 2020/246796 A1 | 12/2020 |

OTHER PUBLICATIONS

European Search Report dated Aug. 23, 2022 in European Patent Application No. 20881850.0 (8 pages).

* cited by examiner

REFRIGERATOR

CROSS-REFERENCE TO RELATED APPLICATION(S)

This application is based on and claims priority under 35 U.S.C. § 119 to Korean Patent Application No. 10-2019-0134339, filed on Oct. 28, 2019, in the Korean Intellectual Property Office, the disclosure of which is incorporated by reference herein in its entirety.

BACKGROUND

1. Field

The disclosure relates to a refrigerator including a display provided on a door to be able to move up and down and rotate.

2. Description of Related Art

In general, a refrigerator is an electronic apparatus that stores food in a fresh state by including a storage compartment storing food and a cold air supply device supplying cold air to the storage compartment.

The storage compartment is provided with an open front to allow food to be put in and out, and the open front may be opened and closed by a door.

In recent years, in accordance with the trend of advanced home appliances, refrigerators equipped with displays having input and output functions have been developed and released. Such a display is provided with an output function that visually shows a signal received from the outside or a refrigerator controller through a screen and an input function that enables a user's manipulation through the display. The display is generally disposed in front of the door for user convenience.

The display is assembled in a state of being firmly fixed to a front surface of the door. Therefore, the height of the display may not be adjustable. Also, the display is not rotated, so that the screen may not be arranged in a horizontal mode and vertical mode according to the user's condition.

In addition, in order to improve the usability of a fixed display, technologies capable of moving a display up and down are being developed, but in these technologies, a locking jaw or a motor is used to fix the position of the display.

When a locking jaw is used, a display becomes concise, but the position where the display may be fixed is limited, and when a motor is used, the position where the display may be fixed is not limited, but the cost increases and the power needs to be applied.

In order to improve the usability of a fixed display, technologies capable of rotating a display are being developed, but in these technologies, a display and a structure for rotating the display are integrated and assembled.

Due to this, although the rotation operation of the display may be reliably performed, it is difficult to separate a display for operations such as maintenance of the display.

SUMMARY

In accordance with an aspect of the disclosure, a refrigerator includes a main body, a door coupled to a front surface of the main body, a bracket coupled to a front surface of the door and including a roller, a sliding plate supported on the roller and fixed to the bracket to slide in a vertical direction, a display supported on the sliding plate, and a position fixing device configured to fix a position of the sliding plate, wherein the position fixing device includes a spur gear rotatably provided on the bracket, a rack gear provided on the sliding plate and engaged with the spur gear, and a stopper configured to prevent rotation of the spur gear when the sliding plate is stopped to fix the position of the sliding plate.

The position fixing device may further include a rotation protrusion provided at a central portion of the spur gear to rotatably support the spur gear, a slot provided on the bracket to rotatably accommodate one end of the rotation protrusion, and a guide groove provided on the sliding plate to guide the other end of the rotation protrusion to be moved in the vertical direction.

The slot may include a first slot extending in the vertical direction and a second slot extending in a horizontal direction from an upper end of the first slot.

The slot may include a first position at which the rotation protrusion is located when the sliding plate is moved upward to an intersection of the first slot and the second slot, and a second position at which the rotation protrusion is located when the sliding plate is moved downward to an end point of the second slot.

The stopper may be provided at a lower end of the first slot that is a lower portion of the first position.

The guide groove may include a first guide groove guiding the rotation protrusion when the sliding plate is moved upward, a second groove guiding the rotation protrusion when the sliding plate is moved downward, a third guide groove connecting a lower portion of the first guide groove and a lower portion of the second guide groove, and a fourth guide groove connecting an upper portion of the first guide groove and an upper portion of the second guide groove.

The first guide groove may be provided adjacent to the rack gear so that the spur gear is engaged with the rack gear when the rotation protrusion is guided through the first guide groove.

The first guide groove may include a first section corresponding to the rack gear, and a second section positioned above the first section.

When the sliding plate is moved upward in a state of being maximally moved downward, the spur gear may be moved from the second section to the first section and rotated counterclockwise about the rotation protrusion by being engaged with the rack gear in a state where one end of the rotation protrusion is located at the first position, and the other end of the rotation protrusion may be guided along the first guide groove.

When the sliding plate is stopped in a process of being moved upward, the sliding plate may be moved downward by a weight of the display, and the spur gear may be moved downward along the first slot by being rotated clockwise about the rotation protrusion by the rack gear.

When the spur gear is moved downward along the first slot, the spur gear may be engaged with the stopper so that the rotation of the spur gear in a clockwise direction about the rotation protrusion is prevented, and the movement of the rack gear engaged with the spur gear may be stopped so that the position of the sliding plate is fixed.

When the sliding plate is moved upward again in a state where the position of the sliding plate is fixed, the spur gear may be rotated in a counterclockwise direction about the rotation protrusion and separated from the stopper, and then moved upward along the first slot so that the rotation protrusion is moved to the first position.

When the sliding plate is maximally moved upward, one end of the rotation protrusion on the spur gear may be moved from the first position to the second position, and the other end of the rotation protrusion may be moved to the second guide groove through the third guide groove.

When the sliding plate is moved downward in a state of being maximally moved upward, the other end of the rotation protrusion may be guided along the second guide groove in a state where one end of the rotation protrusion on the spur gear is positioned at the second position, and when the sliding plate is maximally moved downward, one end of the rotation protrusion on the spur gear may be moved from the second position to the first position, and the other end of the rotation protrusion may be moved to the first guide groove through the fourth guide groove.

The position fixing device may further include a pair of fixing protrusions provided at upper and lower portions of the bracket, respectively, and a pair of fixing clips provided at upper and lower portions of the sliding plate, respectively, to be fixed to the fixing protrusions when the sliding plate is maximally moved upward and downward, respectively.

In accordance with another aspect of the disclosure, a refrigerator includes a main body, a door coupled to a front surface of the main body, a bracket coupled to a front surface of the door and including a roller, a sliding plate supported on the roller and fixed to the bracket to slide in a vertical direction, a display supported on the sliding plate to be moved in the vertical direction together with the sliding plate, a spur gear rotatably provided on the bracket, a rack gear provided on the sliding plate and engaged with the spur gear to be moved in the vertical direction together with the sliding plate, and a stopper configured to prevent rotation of the spur gear when the rack gear is moved downward to prevent the rack gear from being moved downward.

The refrigerator may further include a rotation protrusion provided at a central portion of the spur gear to rotatably support the spur gear, a slot provided on the bracket to rotatably accommodate one end of the rotation protrusion, and a guide groove provided on the sliding plate to guide the other end of the rotation protrusion so that the sliding plate is moved in the vertical direction.

The guide groove may be provided adjacent to the rack gear so that the spur gear is engaged with the rack gear when the rotation protrusion is guided through the guide groove.

The stopper may be provided on the slot, when the sliding plate is moved upward in a state where the spur gear is engaged with the rack gear, the spur gear may be spaced apart from the stopper so that the spur gear is rotated, and when the sliding plate is moved downward, the spur gear may be engaged with the stopper so that the rotation of the spur gear is prevented.

The sliding plate may include the rack gear provided on one of the left and right sides of the sliding plate and a rack gear member provided on the other side, and the bracket may include a pinion gear engaged with the rack gear member and rotated.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Configurations shown in the embodiments and the drawings described in the present specification are only the preferred embodiments of the disclosure, and thus it is to be understood that various modified examples, which may replace the embodiments and the drawings described in the present specification, are possible when filing the present application.

Like reference numbers or signs in the various figures of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that although the terms first, second, etc. may be used herein to describe various components, these components should not be limited by these terms, and the terms are only used to distinguish one component from another. For example, without departing from the scope of the disclosure, the first component may be referred to as a second component, and similarly, the second component may also be referred to as a first component. The term "and/or" includes any combination of a plurality of related items or any one of a plurality of related items.

The terms "front end," "rear end," "upper portion," "lower portion," "upper end" and "lower end" used in the following description are defined with reference to the drawings, and the shape and position of each component are not limited by these terms.

It is an aspect of the disclosure to provide a refrigerator in which a vertical height of a display installed on a front surface of a door may be manually adjusted without limiting the position.

It is an aspect of the disclosure to provide a refrigerator in which a display may be automatically fixed in a state of being adjusted to a desired height.

It is an aspect of the disclosure to provide a refrigerator in which a display is detachably installed in a front surface of a door, and at the same time a screen of the display may be switched between a horizontal mode and a vertical mode by allowing the display to rotate.

Hereinafter, embodiments of the disclosure will be described in detail with reference to the accompanying drawings.

Figure 1:
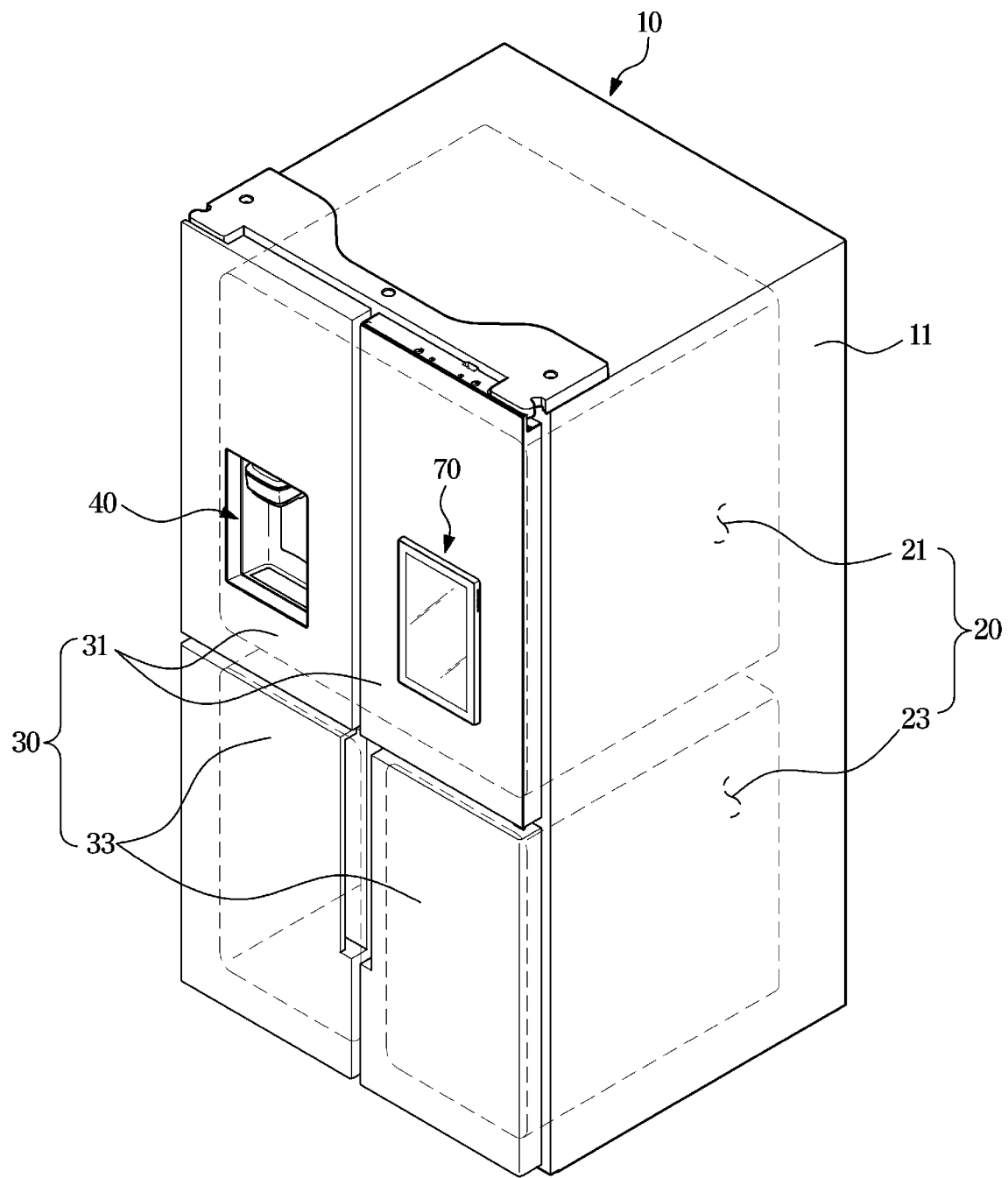
FIG. 1 is a perspective view of a refrigerator according to an embodiment of the disclosure.

FIG. 1 is a perspective view of a refrigerator according to an embodiment of the disclosure.

As illustrated in FIG. 1, a refrigerator may include a main body 10 having a storage compartment 20, and a door 30 rotatably coupled to the front of the main body 10 to open and close the open front of the storage compartment 20.

The main body 10 may include an inner case (not shown) forming the storage compartment 20, an outer case 11 coupled to an outer side of the inner case to form an outer appearance of the refrigerator, and an insulator (not shown) provided between the inner case and the outer case 11 to insulate the storage compartment 20.

The inner case may be made by injection molding a plastic material, and the outer case 11 may be made of a metal material. Urethane foam insulation may be used as the insulator, and a vacuum insulation panel may be used together as needed.

The main body 10 may include an intermediate wall (not shown), and the storage compartment 20 may be divided into an upper storage chamber 21 and a lower storage chamber 23 by the intermediate wall. The intermediate wall may include the insulator to insulate the upper storage chamber 21 and the lower storage chamber 23.

The upper storage chamber 21 may be used as a refrigerating chamber in which food is stored in a refrigerating mode by being maintained in substantially 0 to 5 degrees Celsius, and the lower storage chamber 23 may be used as a freezing chamber in which food is stored in a freezing mode by being maintained in substantially −30 to 0 degrees Celsius.

The storage compartment 20 is provided with an open front to allow food to be put in and out, and the open front of the storage compartment 20 may be opened and closed by the door 30 rotatably provided in the front of the storage compartment 20.

The door 30 may include a pair of refrigerating chamber doors 31 to opening and closing the refrigerating chamber 21, which is the upper storage chamber, and a pair of freezing chamber doors 33 to opening and closing the freezing chamber 23, which is the lower storage chamber. A door guard (not shown) capable of storing food and the like may be provided on a rear surface of the door 30.

A dispenser 40 may be provided on one side of the pair of refrigerating chamber doors 31, and a display 70 may be provided on the other side thereof.

The dispenser 40 may be disposed on a front surface of the refrigerating chamber door 31 to provide water and ice to a user. The dispenser 40 may be recessed to receive water and ice.

The display 70 may be disposed on the front surface of the refrigerating chamber door 31 to inform the user of information or to enable manipulation by the user. The display 70 may be detachably installed on the front surface of the refrigerating chamber door 31. The display 70 may be rotatably installed on the front surface of the refrigerating chamber door 31. The display 70 may include an output function that visually shows a signal received from the outside or a refrigerator controller (not shown) through a screen, and an input function that enables the user's manipulation through the display 70.

Figure 2:
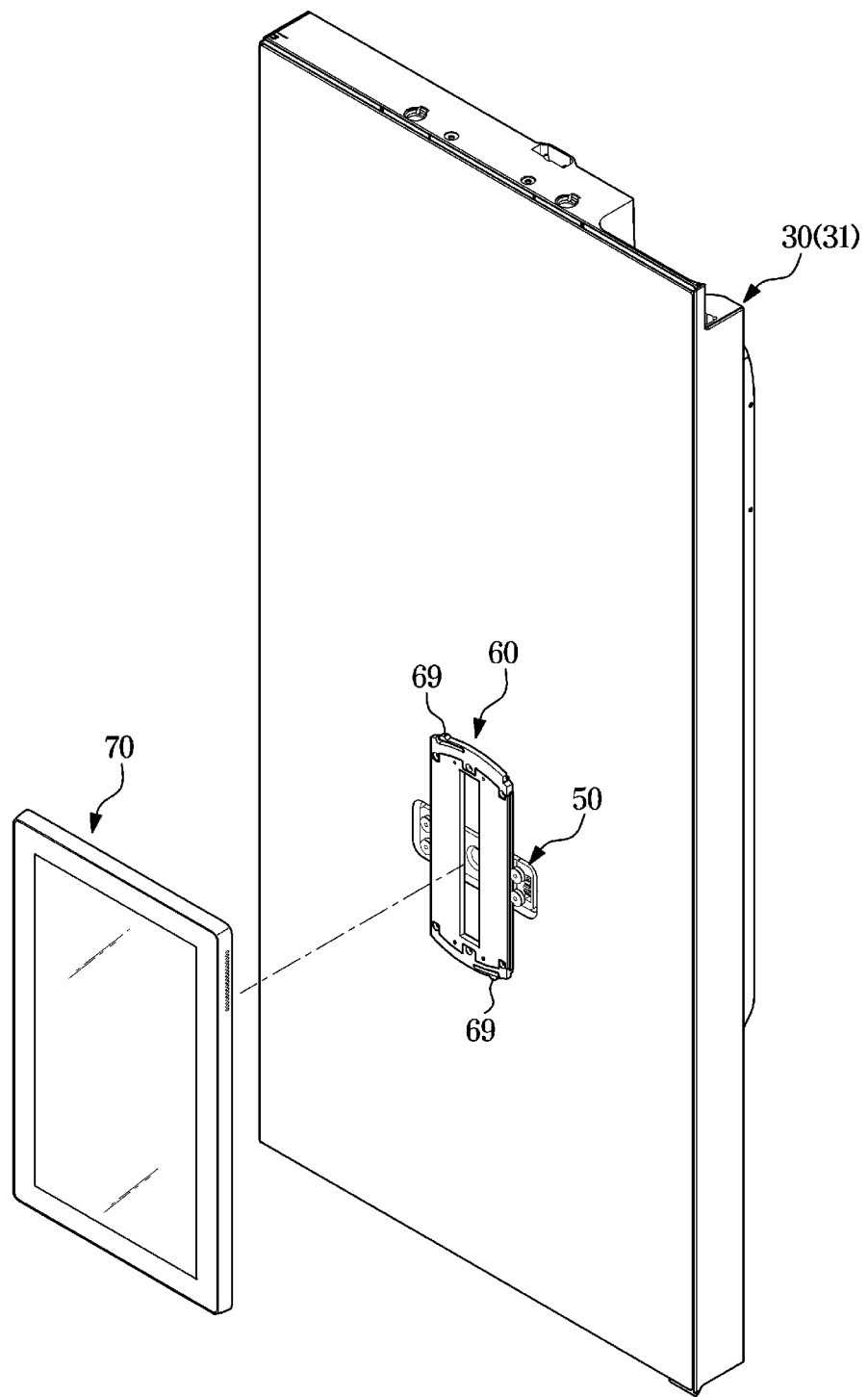
FIG. 2 illustrates that a display according to an embodiment of the disclosure is assembled on a front surface of a refrigerating chamber door.
Figure 3:
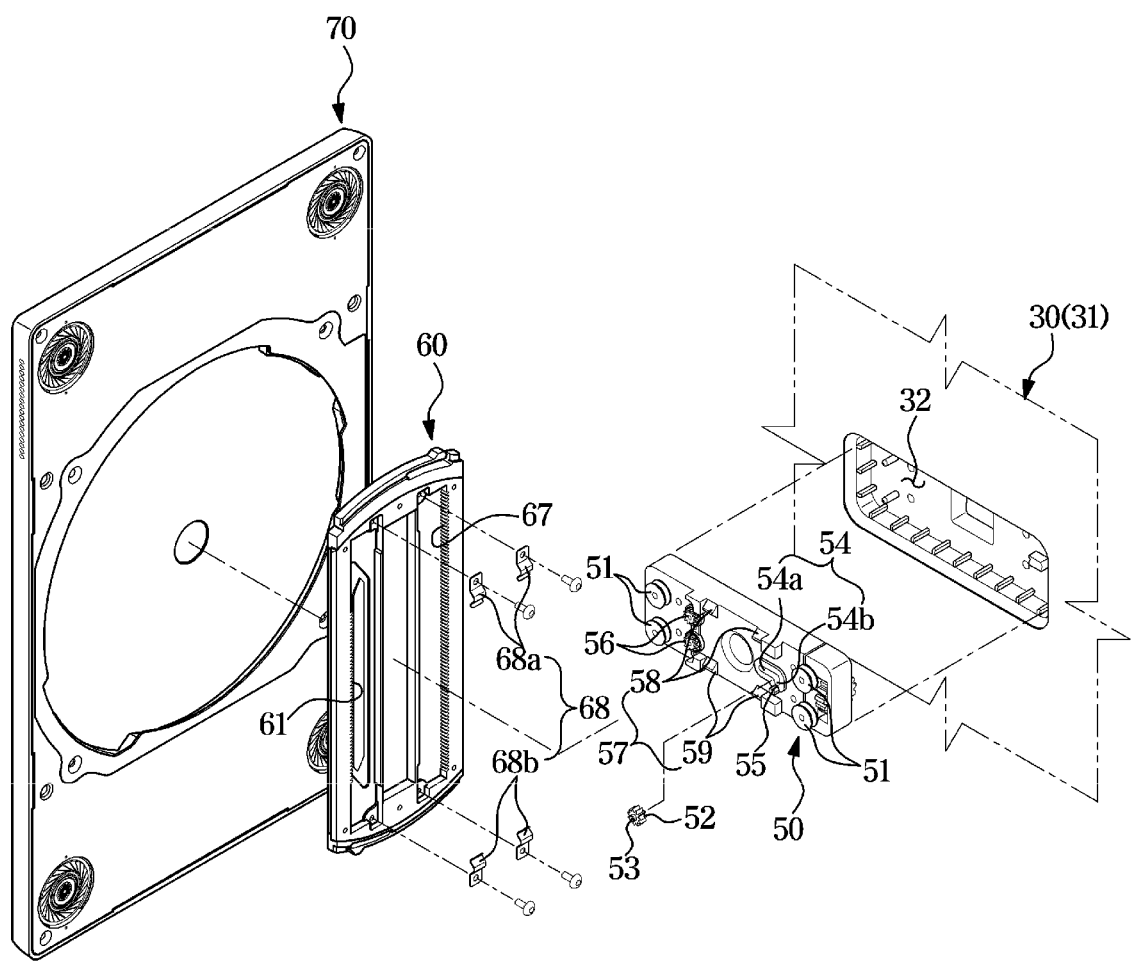
FIG. 3 is an exploded perspective view of a bracket and a sliding plate for allowing the display according to an embodiment of the disclosure to slide in a vertical direction on the front surface of the refrigerating chamber door.
Figure 4:
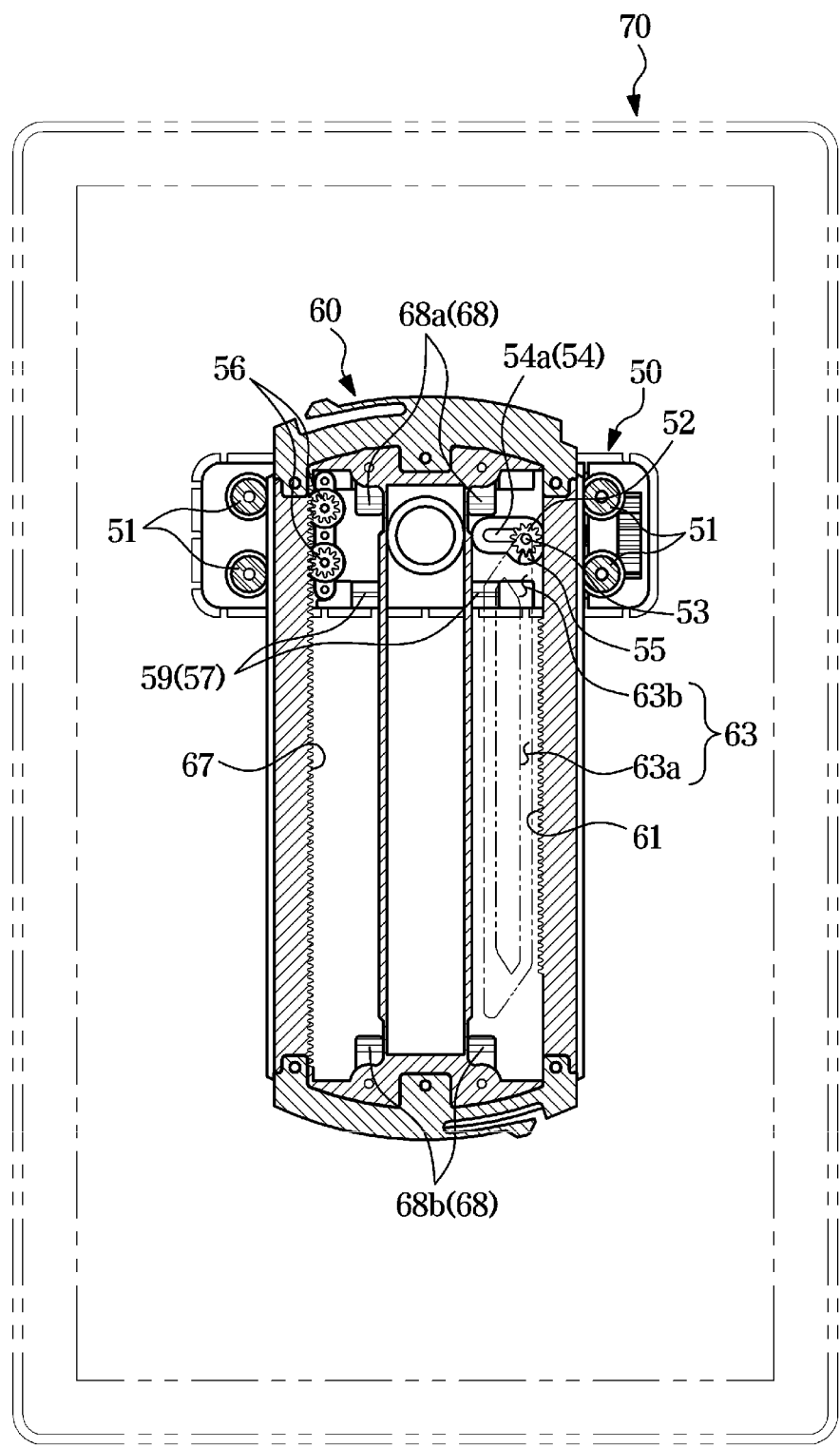
FIG. 4 illustrates a state where the sliding plate according to an embodiment of the disclosure is maximally moved downward.
Figure 5:
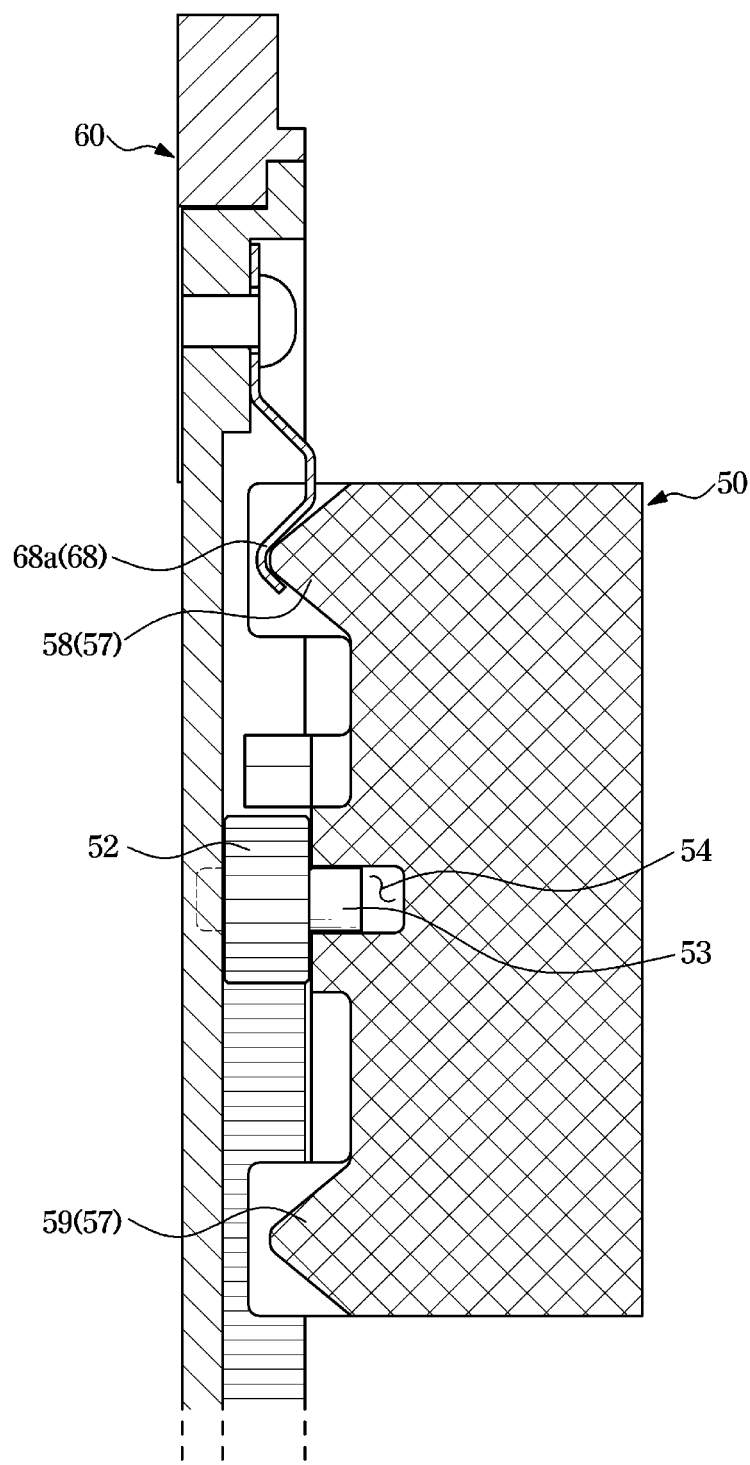
FIG. 5 is a cross-sectional view of the sliding plate fixed to the bracket when the sliding plate according to an embodiment of the disclosure is maximally moved downward.

FIG. 2 illustrates that a display according to an embodiment of the disclosure is assembled on a front surface of a refrigerating chamber door. FIG. 3 is an exploded perspective view of a bracket and a sliding plate for allowing the display according to an embodiment of the disclosure to slide in a vertical direction on the front surface of the refrigerating chamber door. FIG. 4 illustrates a state where the sliding plate according to an embodiment of the disclosure is maximally moved downward. FIG. 5 is a cross-sectional view of the sliding plate fixed to the bracket when the sliding plate according to an embodiment of the disclosure is maximally moved downward.

As illustrated in FIGS. 2 to 5, a bracket coupling portion 32 to which a bracket 50 is coupled may be provided on the front surface of the refrigerating chamber door 31. The bracket coupling portion 32 may be formed in a recessed shape so that the bracket 50 is received therein and coupled thereto. A sliding plate 60 may be fixed to a front surface of the bracket 50 so as to be slidable in a vertical direction. Accordingly, the sliding plate 60 may be fixed to the front surface of the refrigerating chamber door 31 so as to be slidable in the vertical direction. The display 70 may be assembled on a front surface of the sliding plate 60. Accordingly, the display 70 may be provided on the front surface of the refrigerating chamber door 31 so as to be slidable in the vertical direction.

The bracket 50 may include a plurality of rollers 51 to support the sliding plate 60 to be slidable, a spur gear 52 provided rotatably to guide the upward movement of the sliding plate 60, a rotation protrusion 53 to rotatably support the spur gear 52, a slot 54 in which one end of the rotation protrusion 53 is rotatably accommodated, a stopper 55 to prevent the spur gear 52 from rotating, a pinion gear 56 provided rotatably to guide the vertical movement of the sliding plate 60, and a plurality of fixing protrusions 57 to fix the sliding plate 60 when the sliding plate 60 is maximally moved upward and downward, respectively.

The rollers 51 may be disposed in one pair on the left and right sides of the bracket 50, respectively. The rollers 51 may support the left side and the right side of the sliding plate 60 so that the sliding plate 60 slides in the vertical direction. The drawing shows that the rollers 51 are provided in one pair on the left and right sides of the bracket 50, and consist of a total of four rollers, but the disclosure is not limited thereto.

The spur gear 52 may be rotatably disposed on the bracket 50. The spur gear 52 may be rotated by being engaged with a rack gear 61 of the sliding plate 60, which will be described later. When the sliding plate 60 is moved upward, the spur gear 52 may be rotated by being engaged with the rack gear 61 moving upward together with the sliding plate 60.

The rotation protrusion 53 may protrude from a central portion of the spur gear 52. The rotation protrusion 53 may protrude from front and rear surfaces of the spur gear 52, respectively. One end of the rotation protrusion 53 protruding from the rear surface of the spur gear 52 may be accommodated in the slot 54. That is, one end of the rotation protrusion 53 may be rotatably accommodated in the slot 54. The other end of the rotation protrusion 53 protruding from a front surface of the spur gear 52 may be accommodated in a guide groove 62 of the sliding plate 60. The other end of the rotation protrusion 53 accommodated in the guide groove 62 may be moved in the vertical direction along the guide groove 62. The sliding plate 60 may be slid in the vertical direction by the rotation protrusion 53 moving in the vertical direction along the guide groove 62. This, for convenience of explanation, may be to represent a movement path of the rotation protrusion 53 within the guide groove 62 when the sliding plate 60 is fixed. Actually, because the rotation protrusion 53 is fixed without moving in the vertical direction and the sliding plate 60 is moved in the vertical direction, the guide groove 62 may be moved in the vertical direction.

The slot 54 is formed on the bracket 50, and one end of the rotation protrusion 53 may be rotatably accommodated therein. The slot 54 may be formed in a "]" shape. The slot 54 may include a first slot 54a extending in the vertical direction on the bracket 50, and a second slot 54b extending in the horizontal direction from an upper end of the first slot 54a. The second slot 54b may be formed to extend horizontally in the left direction from the upper end of the first slot 54a. The stopper 55 may be positioned below the first slot 54a. The first slot 54a may be used as a path through which the rotation protrusion 53 moves when the sliding plate 60 is fixed in a process of being moved upward. That is, when the rotation protrusion 53 moves downward along the first slot 54a so that the spur gear 52 is prevented from rotating by the stopper 55, the movement of the rack gear 61 engaged with the spur gear 52 is also prevented, so that the sliding plate 60 may be fixed. The second slot 54b may be used as a path through which the rotation protrusion 53 moves left and right within the second slot 54b when the sliding plate 60 moves upward and downward. That is, when the sliding plate 60 moves upward, the rotation protrusion 53 may be located on the right side of the second slot 54b, and when the sliding plate 60 moves downward, the rotation protrusion 53 may be located on the left side of the second slot 54b.

Figure 8:
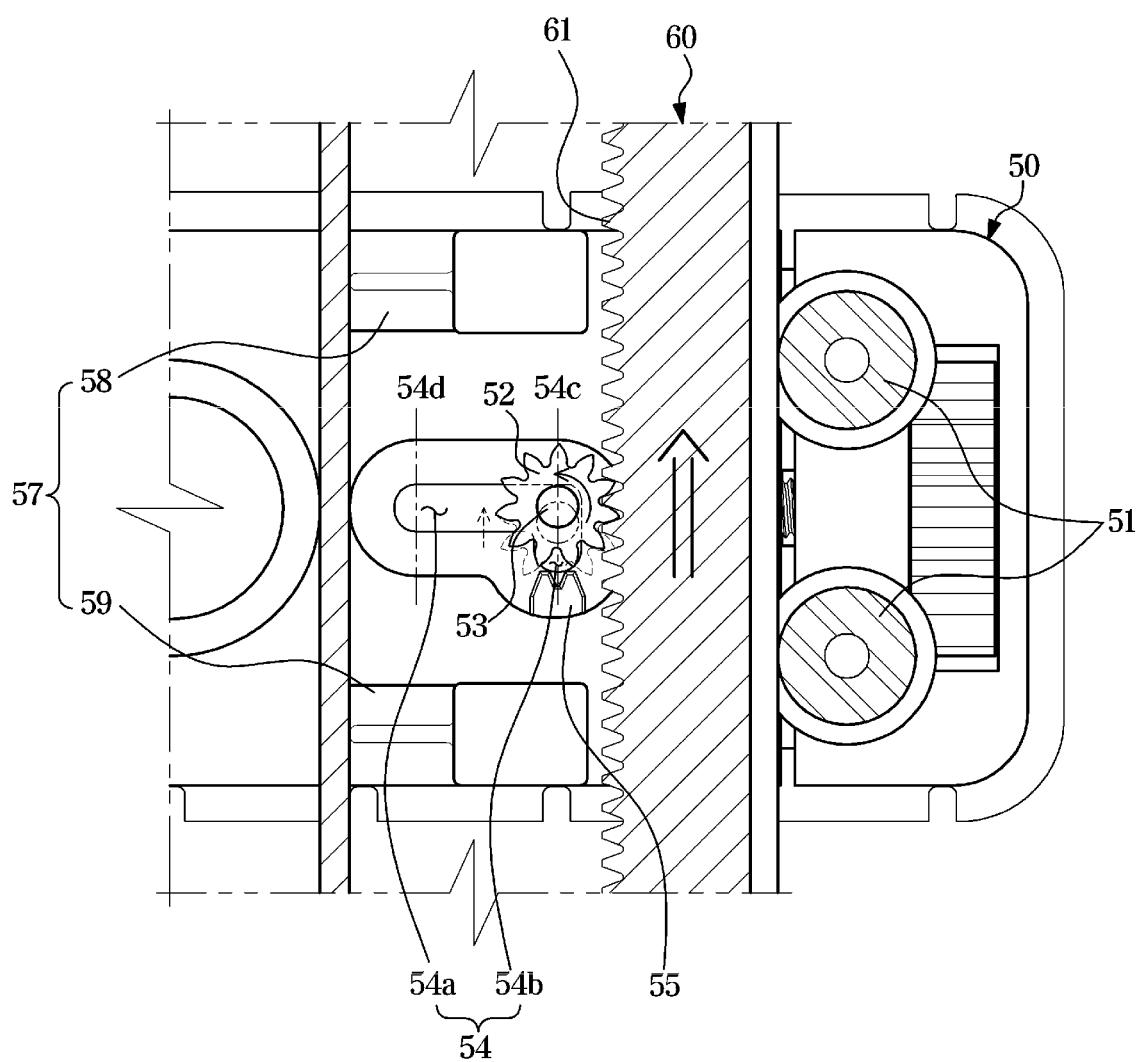
FIG. 8 illustrates the movement of a spur gear when the display according to an embodiment of the disclosure slides upward in a state of being maximally moved downward.
Figure 13:
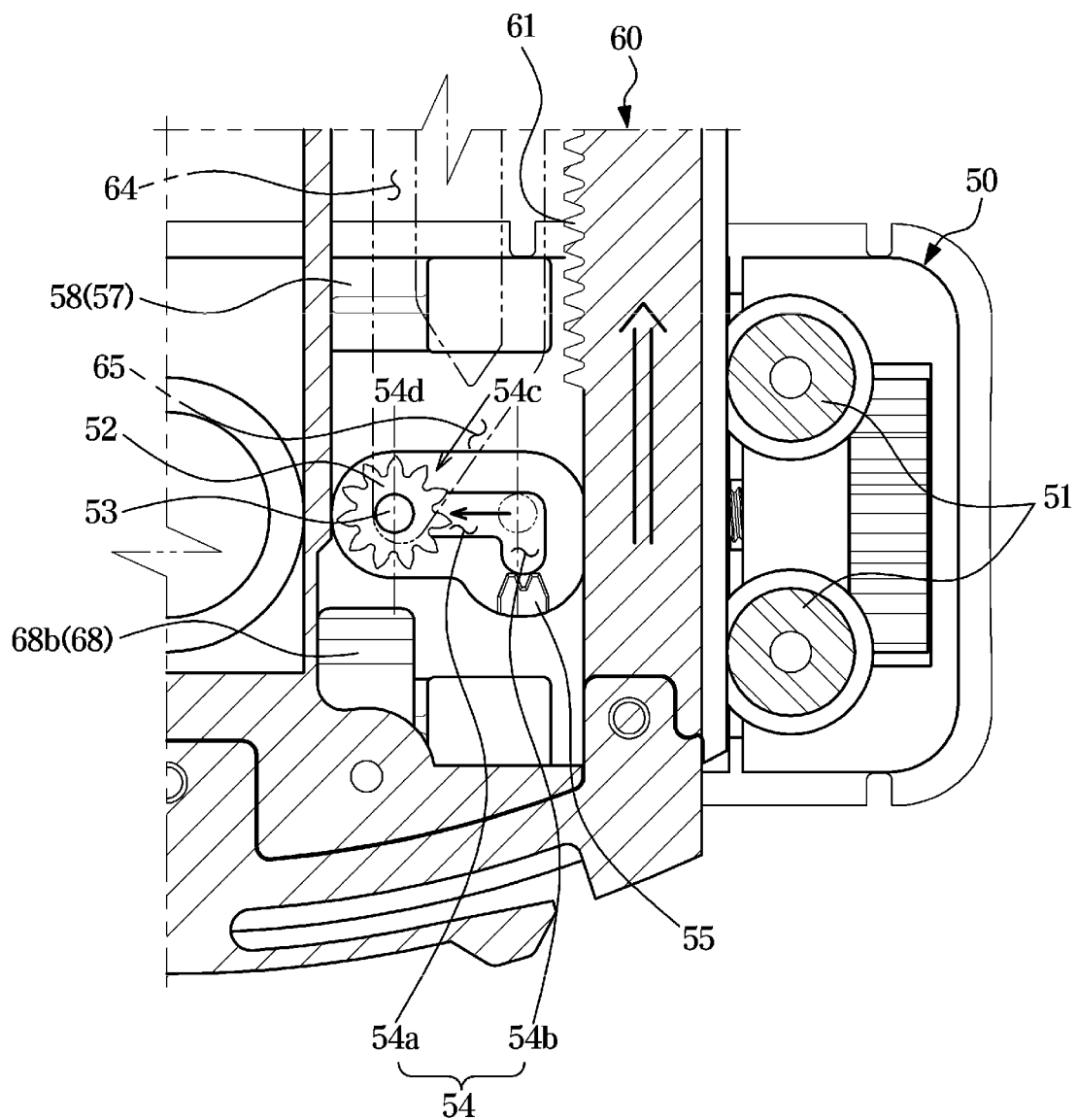
FIG. 13 illustrates that the rotation protrusion is moved from a first position to a second position of a slot when the display according to an embodiment of the disclosure is maximally moved upward.

The slot 54 may include a first position 54c at which the rotation protrusion 53 is positioned when the sliding plate 60 moves upward to an intersection of the first slot 54a and the second slot 54b, and a second position 54d at which the rotation protrusion 53 is positioned when the sliding plate 60 moves downward to an end point of the second slot 54b (see FIGS. 8 and 13).

The stopper 55 may be located at a lower end of the first slot 54a. The stopper 55 may be fixed to prevent rotation. The stopper 55 may be engaged with the spur gear 52. That is, when the spur gear 52 is engaged with the stopper 55 by moving to the lower end of the first slot 54a along the first slot 54a, the rotation of the spur gear 52 may be prevented by the stopper 55. When the rotation of the spur gear 52 is prevented, the rack gear 61 moving upward by being engaged with the spur gear 52 may be fixed without being moved upward. When the rack gear 61 is fixed, the sliding plate 60 on which the rack gear 61 is provided may also be fixed without being moved upward.

Like the spur gear 52, the pinion gear 56 may be rotatably provided on the bracket 50. The pinion gear 56 may be provided on the opposite side of a portion where the spur gear 52 is provided. That is, the spur gear 52 may be provided on the right side of the bracket 50 and engaged with the rack gear 61 of the sliding plate 60 to guide the sliding plate 60 to slide upward. The pinion gear 56 may be provided on the left side of the bracket 50 and engaged with a rack gear member 67 of the sliding plate 60 to guide the sliding plate 60 to slide upward and downward.

The fixing protrusions 57 may be provided in one pair on upper and lower portions of the bracket 50, respectively. The fixing protrusions 57 may include first fixing protrusions 58 provided in one pair on the upper portion of the bracket 50, and second fixing protrusions 59 provided in one pair on the lower portion of the bracket 50. The first fixing protrusion 58 may fix the sliding plate 60 by fixing a first fixing clip 68a of the sliding plate 60 when the sliding plate 60 is maximally moved downward. The second fixing protrusion 59 may fix the sliding plate 60 by fixing a second fixing clip 68b of the sliding plate 60 when the sliding plate 60 is maximally moved upward (see FIG. 14).

The sliding plate 60 may be fixed to the bracket 50 so as to be slidable in the vertical direction. The sliding plate 60 may include the rack gear 61 engaged with the spur gear 52 of the bracket 50, the guide groove 62 to guide the rotation protrusion 53 formed on the spur gear 52, the rack gear member 67 engaged with the pinion gear 56 of the bracket 50, and a plurality of fixing clips 68 fixed to the plurality of fixing protrusions 57 of the bracket 50 when the sliding plate 60 is maximally moved upward and downward, respectively.

The rack gear 61 may be provided on the right side of the sliding plate 60 to be engaged with the spur gear 52 of the bracket 50. The rack gear 61 may be engaged with the spur gear 52 when the sliding plate 60 slides upward. When the sliding plate 60 slides upward, the rack gear 61 may move upward together with the sliding plate 60 and rotate the engaged spur gear 52. At this time, the spur gear 52 may be rotated counterclockwise about the rotation protrusion 53. Compared with the rack gear member 67, which will be described later, the rack gear 61 may be formed to have a shorter length than the rack gear member 67. This is because the rack gear 61 is configured to guide only the upward movement of the sliding plate 60 and fix the position of the sliding plate 60. That is, this is because the position of the sliding plate 60 may be fixed by the fixing protrusion 57 of the bracket 50 and the fixing clip 68 of the sliding plate 60 when the sliding plate 60 is maximally moved downward or maximally moved upward. That is, because the rack gear 61 only needs to fix the position of the sliding plate 60 between the position where the sliding plate 60 is maximally moved downward and the position where the sliding plate 60 is maximally moved upward, the rack gear 61 may not need to be formed long like the rack gear member 67. The drawing shows that the spur gear 52 is rotated counterclockwise about the rotation protrusion 53, but the disclosure is not limited thereto. That is, the spur gear 52 may be provided to rotate clockwise about the rotation protrusion 53 according to a position to be assembled.

The guide groove 62 may be provided on the sliding plate 60 to accommodate the other end of the rotation protrusion 53. The other end of the rotation protrusion 53 accommodated in the guide groove 62 may be moved in the vertical direction along the guide groove 62. The sliding plate 60 may be slid in the vertical direction by the rotation protrusion 53 moving in the vertical direction along the guide groove 62. This, for convenience of explanation, may be to represent a movement path of the rotation protrusion 53 within the guide groove 62 when the sliding plate 60 is fixed. Actually, because the rotation protrusion 53 is fixed without moving in the vertical direction and the sliding plate 60 is moved in the vertical direction, the guide groove 62 may be moved in the vertical direction.

Figure 9:
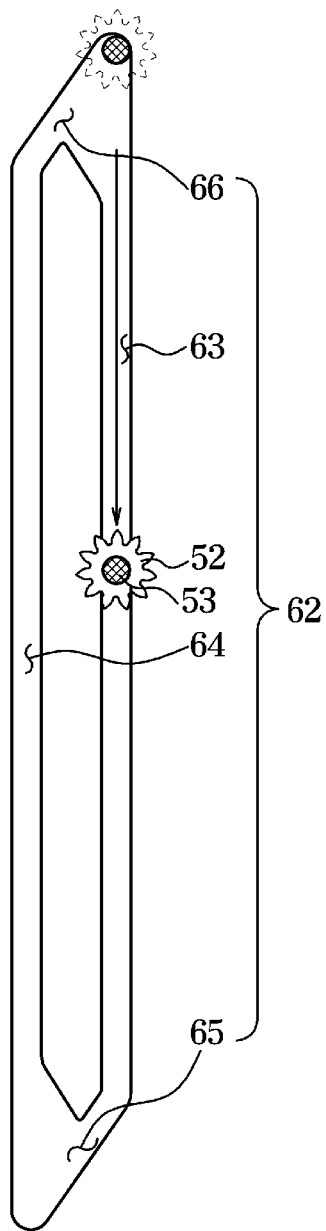
FIG. 9 illustrates that a rotation protrusion is guided by a first guide groove when the display according to an embodiment of the disclosure slides upward in a state of being maximally moved downward.

The guide groove 62 may include a first guide groove 63 guiding the rotation protrusion 53 when the sliding plate 60 is moved upward, a second guide groove 64 guiding the rotation protrusion 53 when the sliding plate 60 is moved downward, a third guide groove 65 connecting a lower portion of the first guide groove 63 and a lower portion of the second guide groove 64, and a fourth guide groove 66 connecting an upper portion of the first guide groove 63 and an upper portion of the second guide groove 64 (see FIG. 9).

The first guide groove 63 may be provided adjacent to the rack gear 61 so that the spur gear 52 may be engaged with the rack gear 61 when the rotation protrusion 53 is guided through the first guide groove 63. The first guide groove 63 may include a first section 63a corresponding to the rack gear 61 and a second section 63b positioned above the first section 63a. That is, when the rotation protrusion 53 is guided through the first section 63a of the first guide groove 63, the spur gear 52 may be engaged with the rack gear 61. Accordingly, when the rotation protrusion 53 is positioned in the first section 63a of the first guide groove 63, the position of the sliding plate 60 may be fixed (see FIG. 9). Although the drawing shows that the first guide groove 63 includes the first section 63a corresponding to the rack gear 61 and the second section 63b corresponding to a portion without the rack gear 61, the rack gear 61 may be provided to correspond to all sections of the first guide groove 63 including the first section 63a and the second section 63b. That is, all sections including the first section 63a and the second section 63b of the first guide groove 63 may correspond to the rack gear 61.

The second guide groove 64 may be provided on the left side of the first guide groove 63. When the rotation protrusion 53 is guided through the first guide groove 63 so that the sliding plate 60 is maximally moved upward, the rotation protrusion 53 may be moved to the second guide groove 64. When the rotation protrusion 53 is moved to the second guide groove 64, the rotation protrusion 53 is guided through the second guide groove 64 so that the sliding plate 60 may be moved downward (see FIG. 16).

The third guide groove 65 may connect the lower portion of the first guide groove 63 and the lower portion of the second guide groove 64. When the rotation protrusion 53 is guided through the first guide groove 63 so that the sliding plate 60 is maximally moved upward, the rotation protrusion 53 may be moved to the second guide groove 64 through the third guide groove 65 (see FIG. 12).

The fourth guide groove 66 may connect the upper portion of the first guide groove 63 and the upper portion of the second guide groove 64. When the rotation protrusion 53 is guided through the second guide groove 64 so that the sliding plate 60 is maximally moved downward, the rotation protrusion 53 may be moved to the first guide groove 63 through the fourth guide groove 66 (see FIG. 17).

The rack gear member 67 may be provided on the left side of the sliding plate 60 to be engaged with the pinion gear 56 of the bracket 50. The rack gear member 67 may be engaged with the pinion gear 56 to guide the sliding plate 60 to be slid upward and downward.

The fixing dips 68 may be provided in one pair on the upper and lower portions of the sliding plate 60, respectively. The fixing dips 68 may include the first fixing clips 68a provided in one pair on the upper portion of the sliding plate 60 and the second fixing clips 68b provided in one pair on the lower part of the sliding plate 60. The first fixing dip 68a may be fixed to the first fixing protrusion 58 of the bracket 50 to fix the sliding plate 60, when the sliding plate 60 is maximally moved downward. The second fixing clips 68b may be fixed to the second fixing protrusion 59 of the bracket 50 to fix the sliding plate 60, when the sliding plate 60 is maximally moved upward (see FIG. 14).

In the above, the components provided on the bracket 50 and the sliding plate 60 to fix the position of the sliding plate 60 may be a position fixing device.

Hereinafter, an operation of sliding the display 70 upward will be described in detail.

Figure 6:
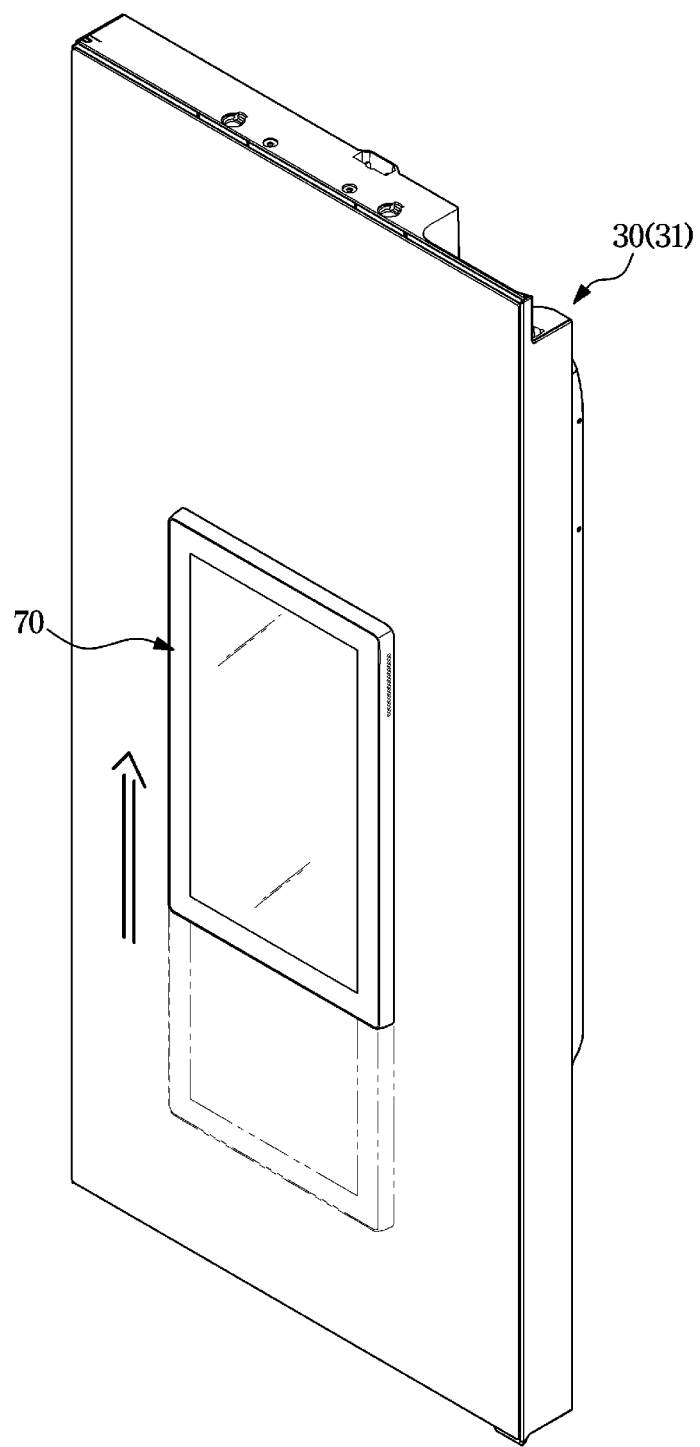
FIG. 6 illustrates that the display according to an embodiment of the disclosure slides upward.
Figure 7:
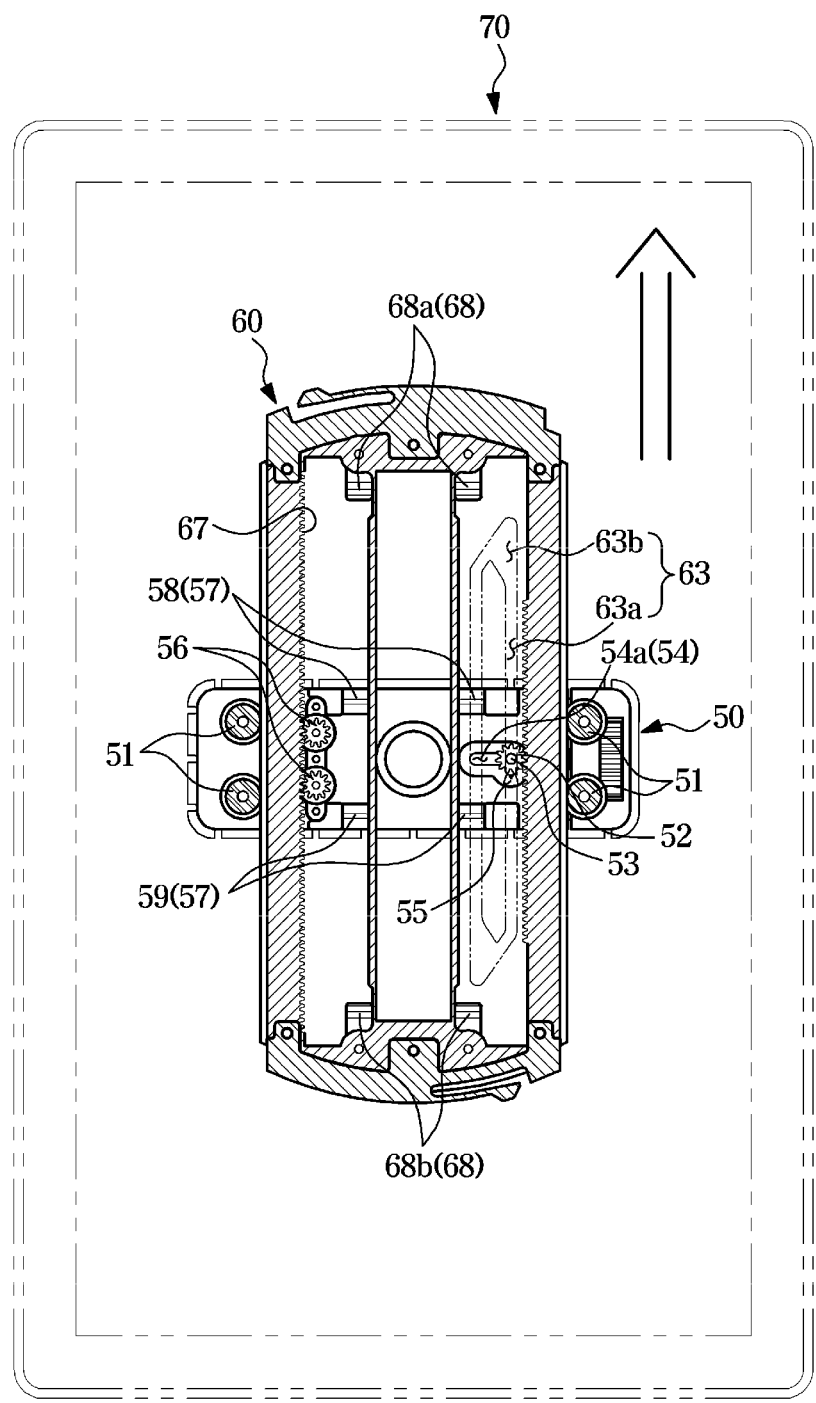
FIG. 7 illustrates an operation of the sliding plate when the display according to an embodiment of the disclosure is slid upward.

FIG. 6 illustrates that the display according to an embodiment of the disclosure slides upward. FIG. 7 illustrates an operation of the sliding plate when the display according to an embodiment of the disclosure is slid upward. FIG. 8 illustrates the movement of a spur gear when the display according to an embodiment of the disclosure slides upward in a state of being maximally moved downward. FIG. 9 illustrates that a rotation protrusion is guided by a first guide groove when the display according to an embodiment of the disclosure slides upward in a state of being maximally moved downward.

As illustrated in FIGS. 6 and 7, the user may manually slide the display 70 upward in a position where the display 70 is maximally moved downward (see FIGS. 4 and 5). When the display 70 is moved upward, the sliding plate 60 on which the display 70 is supported may be moved upward together with the display 70. Opposite sides of the sliding plate 60 may be supported on the plurality of rollers 51 provided on the bracket 50. When the sliding plate 60 is moved upward, the plurality of rollers 51 supporting the opposite sides of the sliding plate 60 rotate, so that the sliding plate 60 may be moved upward.

At this time, as illustrated in FIG. 7, the spur gear 52 is spaced apart from the stopper 55 in a state where the rotation is prevented by being engaged with the stopper 55 and may be moved upward. Because the spur gear 52 is engaged with the rack gear 61, when the rack gear 61 is moved upward, the spur gear 52 may be spaced apart from the stopper 55 by being moved upward while rotating counterclockwise about the rotation protrusion 53. That is, one end of the rotation protrusion 53 may be moved from a lower portion of the first slot 54a to the first position 54c. At this time, the other end of the rotation protrusion 53 may be guided downward along the first guide groove 63 at the upper end of the first guide groove 63.

When the sliding plate 60 is moved upward, the spur gear 52 may be rotated by being engaged with the rack gear 61, and the pinion gear 56 may be rotated by being engaged with the rack gear member 67.

Hereinafter, an operation of fixing the position of the display 70 in a process of sliding the display 70 upward will be described in detail.

Figure 10:
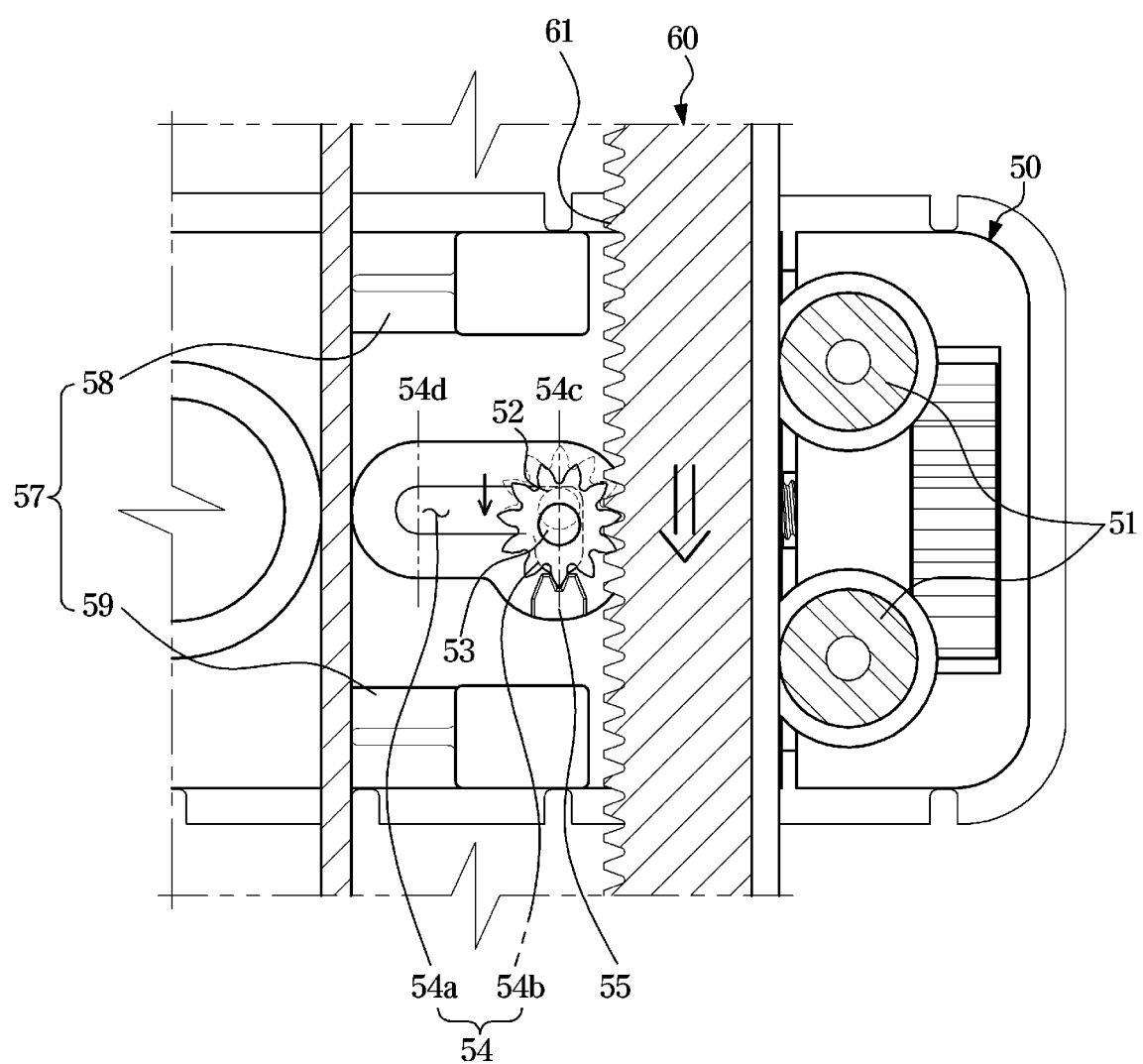
FIG. 10 illustrates the movement of the spur gear when the display according to an embodiment of the disclosure is slid upward and then stopped.

FIG. 10 illustrates the movement of the spur gear when the display according to an embodiment of the disclosure is slid upward and then stopped.

As illustrated in FIG. 10, when the display 70 is positioned at a desired height while being moved upward, the display 70 may be stopped (see FIG. 7). When the user stops the display 70 by releasing his or her hand from the display 70, the sliding plate 60 may be also stopped together with the display 70. When the sliding plate 60 is stopped, the sliding plate 60 may be moved slightly downward by a weight of the display 70. The rack gear 61 may be moved downward together with the sliding plate 60. At this time, the spur gear 52 engaged with the rack gear 61 may be moved downward while rotating clockwise about the rotation protrusion 53. The spur gear 52 moved downward is engaged with the stopper 55 so that the rotation in the clockwise direction about the rotation protrusion 53 may be prevented. When the rotation of the spur gear 52 is prevented, the rack gear 61 also stops moving, so the sliding plate 60 may be fixed without moving any more. Accordingly, the position of the display 70 may be automatically fixed.

Hereinafter, an operation of maximally moving the display 70 upward will be described in detail.

Figure 11:
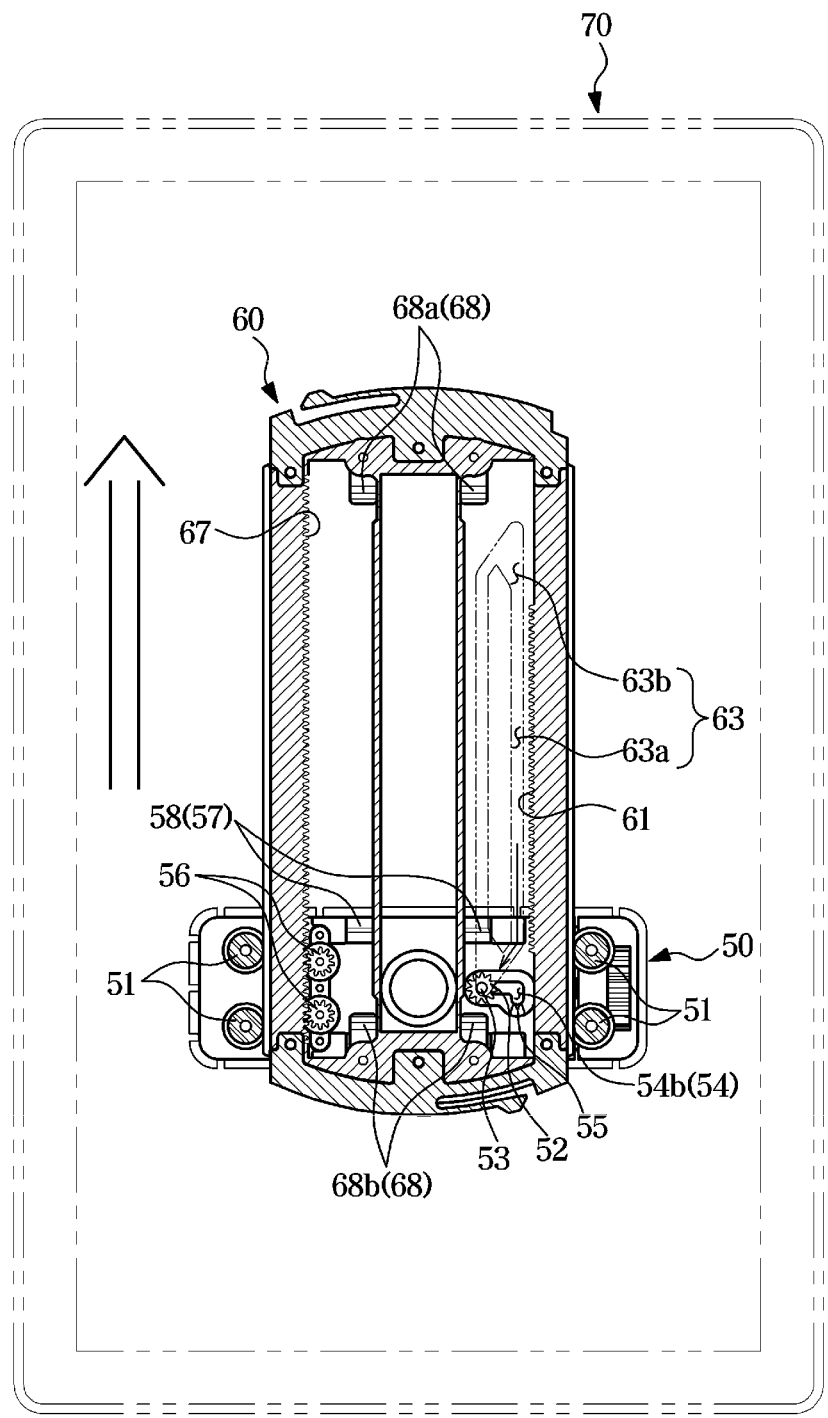
FIG. 11 illustrates a state where the sliding plate according to an embodiment of the disclosure is maximally moved upward.
Figure 12:
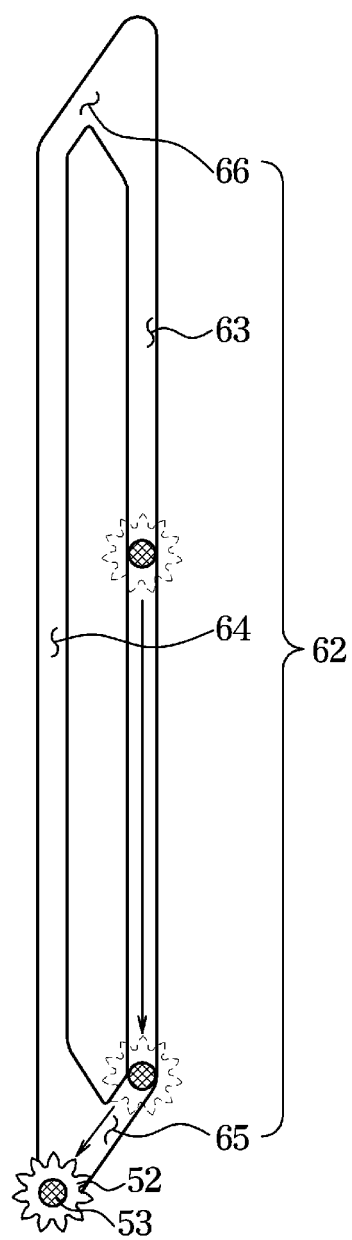
FIG. 12 illustrates that the rotation protrusion is moved from the first guide groove to a second guide groove when the display according to an embodiment of the disclosure is maximally moved upward.
Figure 14:
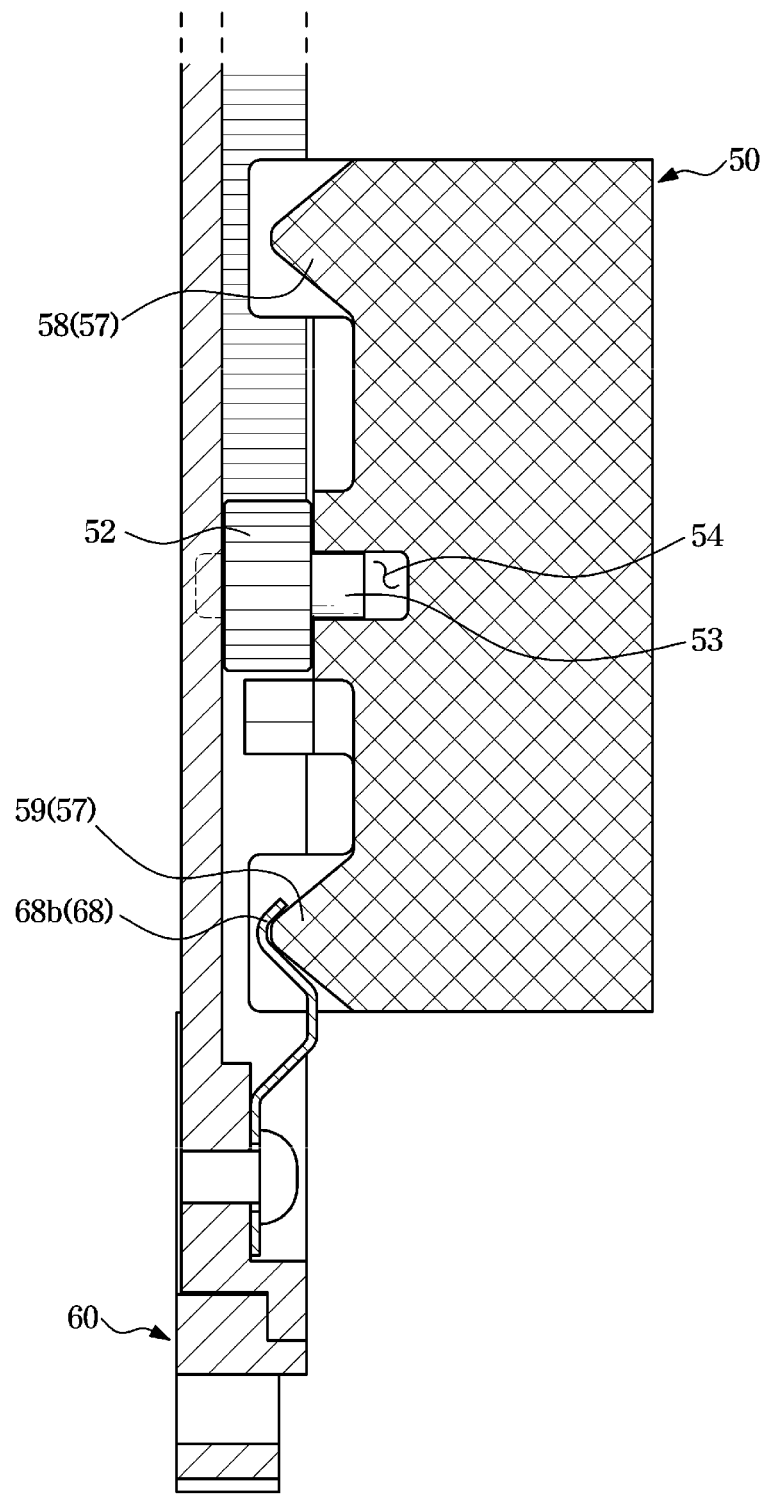
FIG. 14 is a cross-sectional view illustrating a state where the sliding plate is fixed to a bracket when the sliding plate according to an embodiment of the disclosure is maximally moved upward.

FIG. 11 illustrates a state where the sliding plate according to an embodiment of the disclosure is maximally moved upward. FIG. 12 illustrates that the rotation protrusion is moved from the first guide groove to a second guide groove when the display according to an embodiment of the disclosure is maximally moved upward. FIG. 13 illustrates that the rotation protrusion is moved from a first position to a second position of a slot when the display according to an embodiment of the disclosure is maximally moved upward. FIG. 14 is a cross-sectional view illustrating a state where the sliding plate is fixed to a bracket when the sliding plate according to an embodiment of the disclosure is maximally moved upward.

When the sliding plate 60 is maximally moved upward as illustrated in FIG. 11, one end of the rotation protrusion 53 may be moved to the second guide groove 64 from the first guide groove 63 through the third guide groove 65 as illustrated in FIG. 12. At this time, as illustrated in FIG. 13, the other end of the rotation protrusion 53 may be moved to the second position 54d from the first position 54c of the slot 54 so that the spur gear 52 is spaced apart from the rack gear 61. As illustrated in FIG. 14, when the sliding plate 60 is maximally moved upward, the second fixing clip 68b of the sliding plate 60 is fixed to the second fixing protrusion 59 of the bracket 50, so that the sliding plate 60 may be fixed.

Hereinafter, an operation of sliding the display 70 downward will be described in detail.

Figure 15:
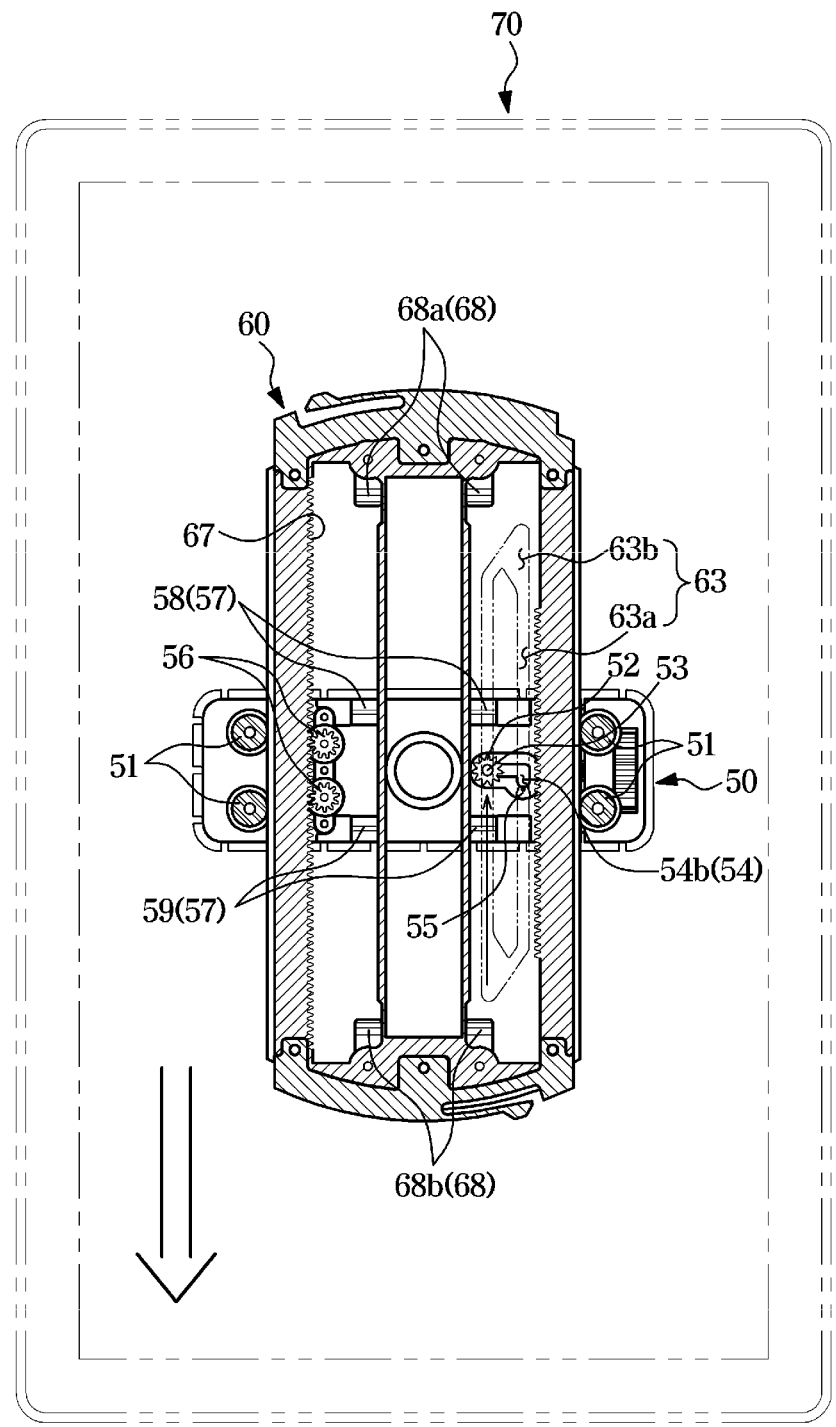
FIG. 15 illustrates that the sliding plate according to an embodiment of the disclosure slides downward in a state of being maximally moved upward.
Figure 16:
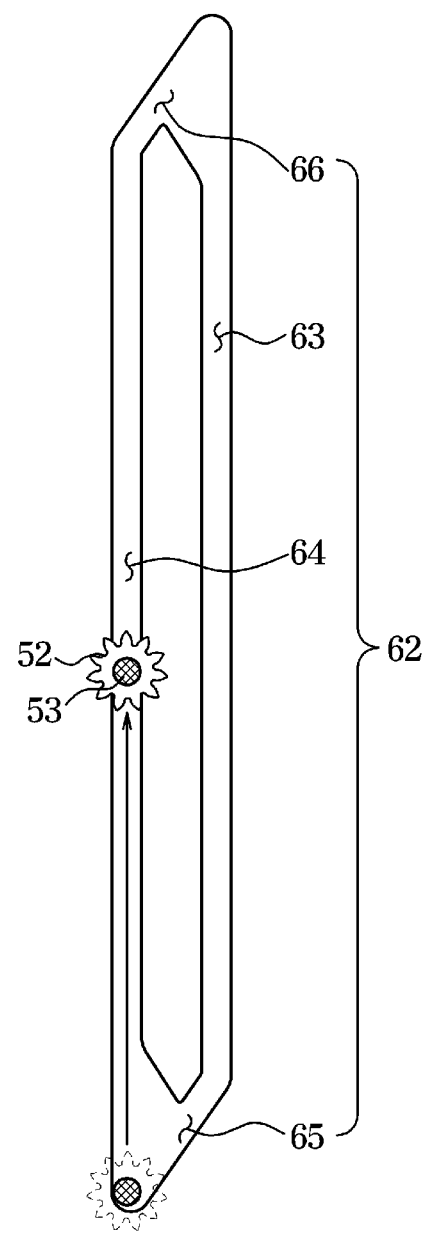
FIG. 16 illustrates that the rotation protrusion is guided by the second guide groove when the sliding plate according to an embodiment of the disclosure is slid downward in a state of being maximally moved upward.
Figure 17:
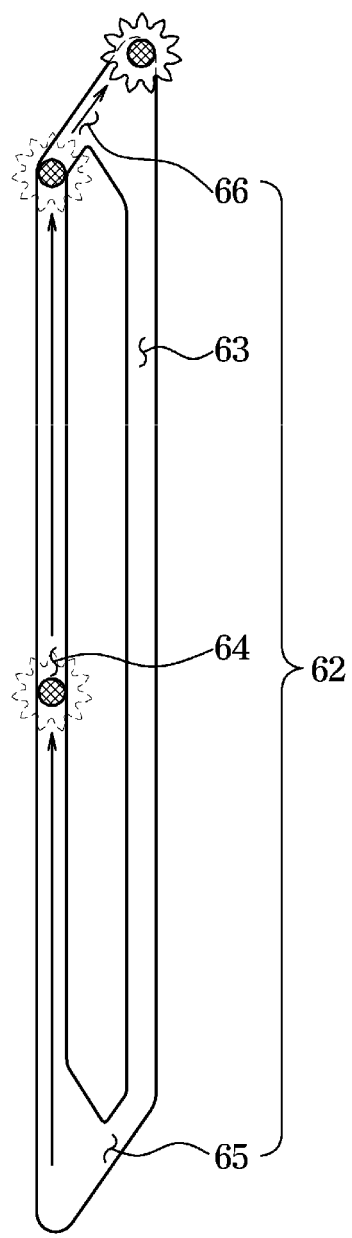
FIG. 17 illustrates that the rotation protrusion is moved from the second guide groove to a fourth guide groove when the sliding plate according to an embodiment of the disclosure is maximally moved downward.

FIG. 15 illustrates that the sliding plate according to an embodiment of the disclosure slides downward in a state of being maximally moved upward. FIG. 16 illustrates that the rotation protrusion is guided by the second guide groove when the sliding plate according to an embodiment of the disclosure is slid downward in a state of being maximally moved upward. FIG. 17 illustrates that the rotation protrusion is moved from the second guide groove to a fourth guide groove when the sliding plate according to an embodiment of the disclosure is maximally moved downward.

As illustrated in FIG. 15, the user may manually slide the display 70 downward in the position where the display 70 is maximally moved upward (see FIG. 11). When the display 70 is moved downward, the sliding plate 60 on which the display 70 is supported may be moved downward together with the display 70. The opposite sides of the sliding plate 60 may be supported on the plurality of rollers 51 provided on the bracket 50. When the sliding plate 60 is moved downward, the plurality of rollers 51 supporting the opposite sides of the sliding plate 60 rotate, so that the sliding plate 60 may be moved downward.

When the sliding plate 60 moves downward, the spur gear 52 is spaced apart from the rack gear 61, and the pinion gear 56 may be rotated by being engaged with the rack gear member 67.

As illustrated in FIG. 16, when the sliding plate 60 is slid downward in a state of being maximally moved upward, the other end of the rotation protrusion 53 may be moved upward along the second guide groove 64.

When the sliding plate 60 is maximally moved downward, as illustrated in FIG. 17, the other end of the rotation protrusion 53 may be moved to the first guide groove from the second guide groove 64 through the fourth guide groove 66.

Figure 18:
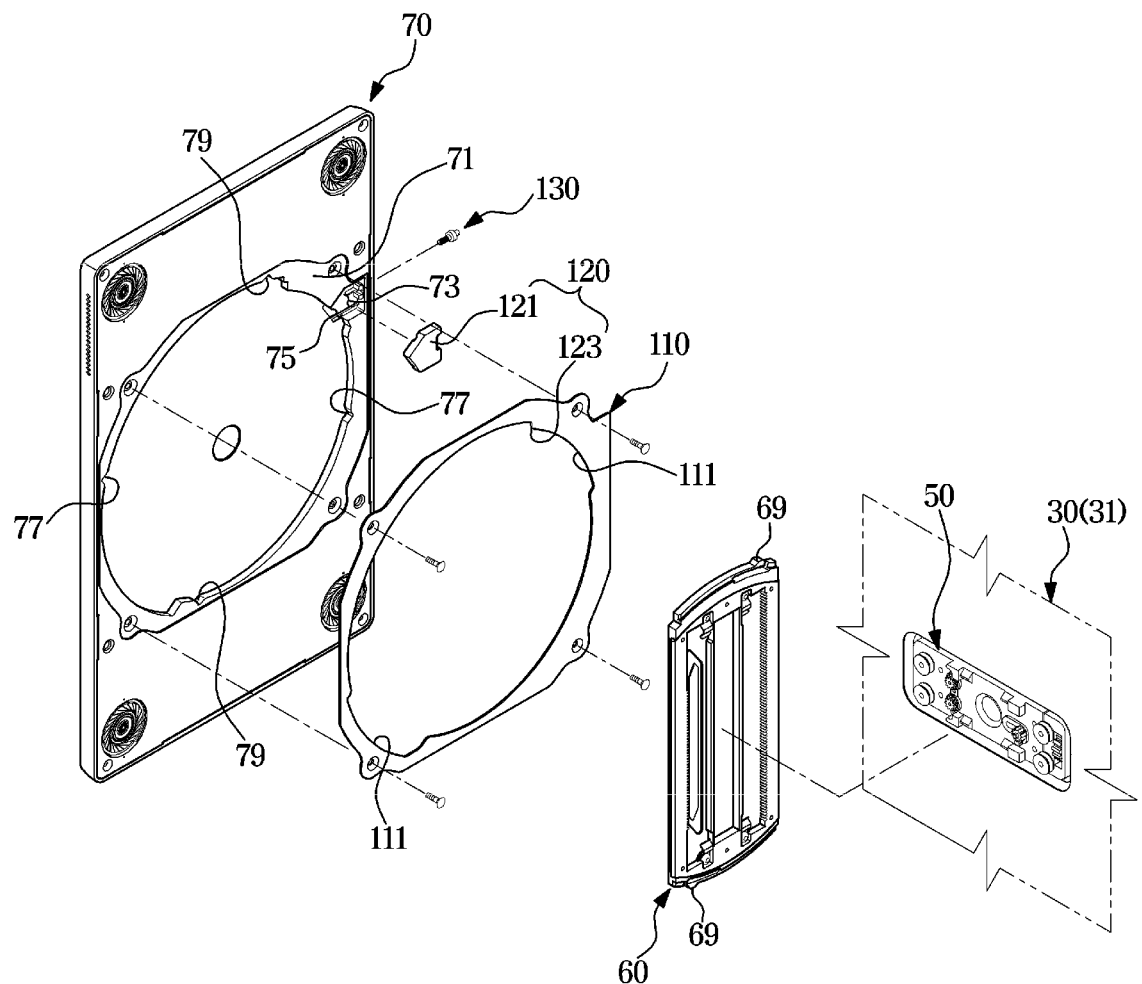
FIG. 18 is an exploded perspective view of a cover display and the sliding plate for allowing the display according to an embodiment of the disclosure to be assembled rotatably and detachably on the front surface of the refrigerating chamber door.

FIG. 18 is an exploded perspective view of a cover display and the sliding plate for allowing the display according to an embodiment of the disclosure to be assembled rotatably and detachably on the front surface of the refrigerating chamber door.

As illustrated in FIG. 18, the bracket 50 may be provided on the front surface of the refrigerating chamber door 31. The sliding plate 60 may be fixed to the bracket 50 to be slidable. The sliding plate 60 may be fixed to the bracket 50 to be slidable in the vertical direction. Accordingly, the sliding plate 60 may be fixed to the front surface of the refrigerating chamber door 31 to be slidable in the vertical direction.

The display 70 may be assembled on the front surface of the sliding plate 60. A cover display 110 may be fastened and fixed to a rear surface of the display 70. The cover display 110 may be rotatably supported on the sliding plate 60. Accordingly, the cover display 110 and the display 70 may be rotatably supported on the sliding plate 60.

The sliding plate 60 may include a pair of fixing portions 69 to allow the display 70 to be fixed without being rotated when the rotation of the cover display 110 is limited by a plurality of rotation limiting parts 120, which will be described later. The pair of fixing portions 69 may be fixed to a plurality of fixing grooves 77 and 79 provided on the display 70 to prevent rotation of the display 70.

The display 70 may include a fastening portion 71 provided on the rear surface of the display 70 so that the cover display 110 is fastened thereto, and a stopper accommodating portion 73 provided on one side of the fastening portion 71 to accommodate a stopper 121, which will be described later.

The fastening portion 71 may have a shape corresponding to the cover display 110. That is, the fastening portion 71 may be formed in a ring shape to correspond to the shape of the cover display 110. The cover display 110 may be fixed by being fastened to the fastening portion 71 of the display 70.

The stopper accommodating portion 73 may be provided on one side of the fastening portion 71. The stopper 121 may be accommodated in the stopper accommodating portion 73. The stopper accommodating portion 73 may include an opening 75 whose one side is open so that a portion of the stopper 121 may protrude into an inner circumferential surface of the cover display 110. A portion of the stopper 121 accommodated in the stopper accommodating portion 73 protrudes through the opening 75 so that when the cover display 110 is rotated, the portion may be caught on the sliding plate 60 while rotating together with the cover display 110. That is, a rotation range of the cover display 110 may be limited by the stopper 121 protruding through the opening 75. A detailed description of this will be described later.

The display 70 may include the plurality of fixing grooves 77 and 79 to which the pair of fixing portions 69 provided on the sliding plate 60 are fixed. The plurality of fixing grooves 77 and 79 may allow the display 70 to be fixed to the sliding plate 60 without being rotated when the rotation of the cover display 110 is limited by the rotation limiting part 120. The plurality of fixing grooves 77 and 79 may include a pair of the first fixing grooves 77 to allow the display 70 to be fixed to the sliding plate 60 when the rotation of the cover display 110 is limited by a locking jaw 123 of the rotation limiting part 120, and a pair of the second fixing grooves 79 to allow the display 70 to be fixed to the sliding plate 60 when the rotation of the cover display 110 is limited by the stopper 121 of the rotation limiting part 120. That is, when the rotation of the cover display 110 is limited by the locking jaw 123, the pair of fixing portions 69 of the sliding plate 60 may be fixed to the pair of first fixing grooves 77. Also, when the rotation of the cover display 110 is limited by the stopper 121, the pair of fixing portions 69 of the sliding plate 60 may be fixed to the pair of second fixing grooves 79.

The cover display 110 may be fixed to the display 70 by being fastened to the fastening portion 71 formed on the rear surface of the display 70. The cover display 110 may be rotatably supported on the sliding plate 60. Accordingly, when the cover display 110 is rotated in a state of being supported on the sliding plate 60, the display 70 may also be rotated together with the cover display 110.

The cover display 110 may include a separation portion 111 to allow the cover display 110 to be separated from the sliding plate 60. The separation portion 111 may be provided at a position corresponding to the sliding plate 60 when the cover display 110 is rotated beyond a rotation range limited by the plurality of rotation limiting parts 120. That is, when the cover display 110 is rotated beyond the limited rotation range, the sliding plate 60 is positioned at the position of the separation portion 111 so that the cover display 110 may be separated from the sliding plate 60 through the separation portion 111. The separation portions 111 may be provided in one pair at positions facing each other. When the cover display 110 rotates and the pair of separation portions 111 are moved to positions corresponding to opposite ends of the sliding plate 60 in the vertical direction, the cover display 110 may be separated from the sliding plate 60.

A plurality of the rotation limiting parts 120 may be provided to limit the rotation range of the cover display 110. The rotation limiting part 120 may include the stopper 121 coupled to the rear surface of the display 70 and the locking jaw 123 provided on the cover display 110.

The stopper 121 may be accommodated in the stopper accommodating portion 73 of the display 70. The stopper 121 accommodated in the stopper accommodating portion 73 may be fixed by a release screw 130. When the stopper 121 is fixed to the release screw 130, a portion of the stopper 121 may protrude through the opening 75.

A portion of the stopper 121 fixed by the release screw 130 may protrude into the inner circumferential surface of the cover display 110 through the opening 75, thereby limiting the rotation range of the cover display 110. That is, the stopper 121 may limit the rotation range so that the cover display 110 may be rotated only up to 90 degrees in a first direction in a state where the locking jaw 123 is caught on the sliding plate 60 to limit the rotation of the cover display 110. The first direction may be a direction in which the display 70 placed long in the vertical direction is rotated to be placed long in the horizontal direction. That is, the first direction may be a direction in which the display 70 is rotated counterclockwise when viewed from the front surface of the refrigerating chamber door 31 (see FIG. 6) and may be a direction in which the display 70 is rotated clockwise when viewed from the rear surface of the refrigerating chamber door 31 (see FIG. 22). That is, when the display 70 is rotated 90 degrees in the first direction in a state where the rotation of the display 70 is limited by the locking jaw 123, the display 70 may not be further rotated in the first direction due to the limitation of rotation by the stopper 121.

When the release screw 130 is loosened so that the fixing of the stopper 121 is released, the stopper 121 may be in a movable state. In this case, the stopper 121 may be moved so that the entire stopper 121 is accommodated in the stopper accommodating portion 73. That is, the stopper 121 may be entirely accommodated in the stopper accommodating portion 73 without a portion protruding through the opening 75. In other words. When the fixing of the stopper 121 is released, the cover display 110 may be rotated 90 degrees or more in the first direction. When the cover display 110 is rotated 90 degrees or more in the first direction, the cover display 110 is rotated to a position where the separation portion 111 corresponds to the sliding plate 60 so that the cover display 110 may be separated from the sliding plate 60.

The locking jaw 123 may be provided on the cover display 110. The locking jaw 123 may limit the rotation range of the cover display 110. The locking jaw 123 may limit the rotation range so that the cover display 110 may be rotated only up to 90 degrees in a second direction in a state where the stopper 121 is caught on the sliding plate 60 to limit the rotation of the cover display 110. The second direction may be a direction opposite to the first direction. The second direction may be a direction in which the display 70 placed long in the horizontal direction is rotated to be placed long in the vertical direction. That is, when the display 70 is rotated 90 degrees in the second direction in a state where the rotation of the display 70 is limited by the stopper 121, the display 70 may not be further rotated in the second direction due to the limitation of rotation by the locking jaw 123.

The release screw 130 may fix the stopper 121 accommodated in the stopper accommodating portion 73. As described above, a portion of the stopper 121 fixed by the release screw 130 may protrude through the opening 75 to limit the rotation range of the cover display 110. It may be appropriate to apply a left-hand thread to the release screw 130. That is, when the release screw 130 is rotated to the left, the stopper 121 may be fixed, and when the release screw 130 is rotated to the right, the fixing of the stopper 121 may be released. The release screw 130 for fixing and releasing the stopper 121 is only an example, but is not limited thereto. That is, any structure may be possible as long as the stopper 121 may be fixed and released.

Hereinafter, an operation of rotating the display 70 will be described in detail.

Figure 19:
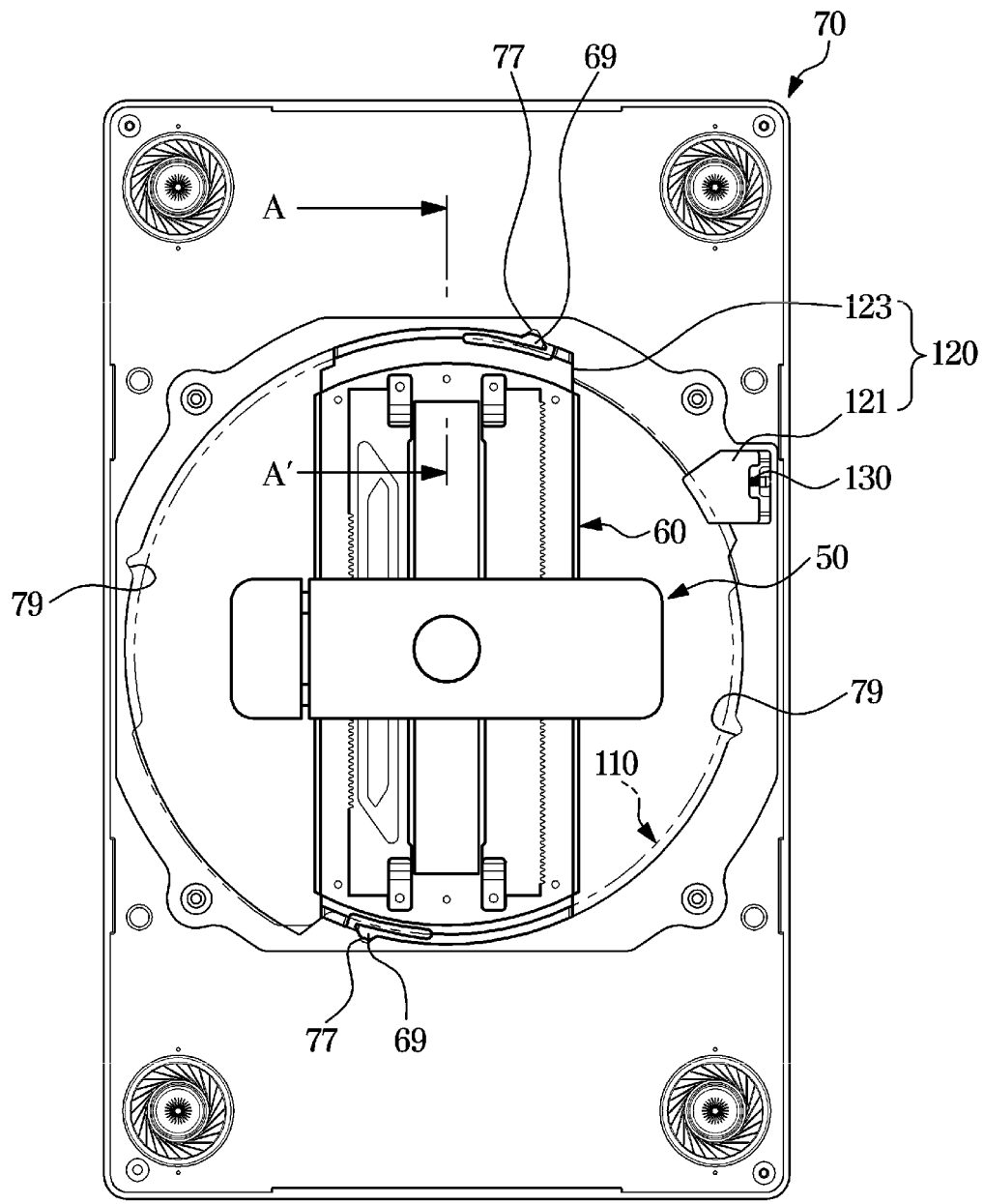
FIG. 19 is a rear view illustrating the display according to an embodiment of the disclosure being positioned long in a vertical direction.
Figure 20:
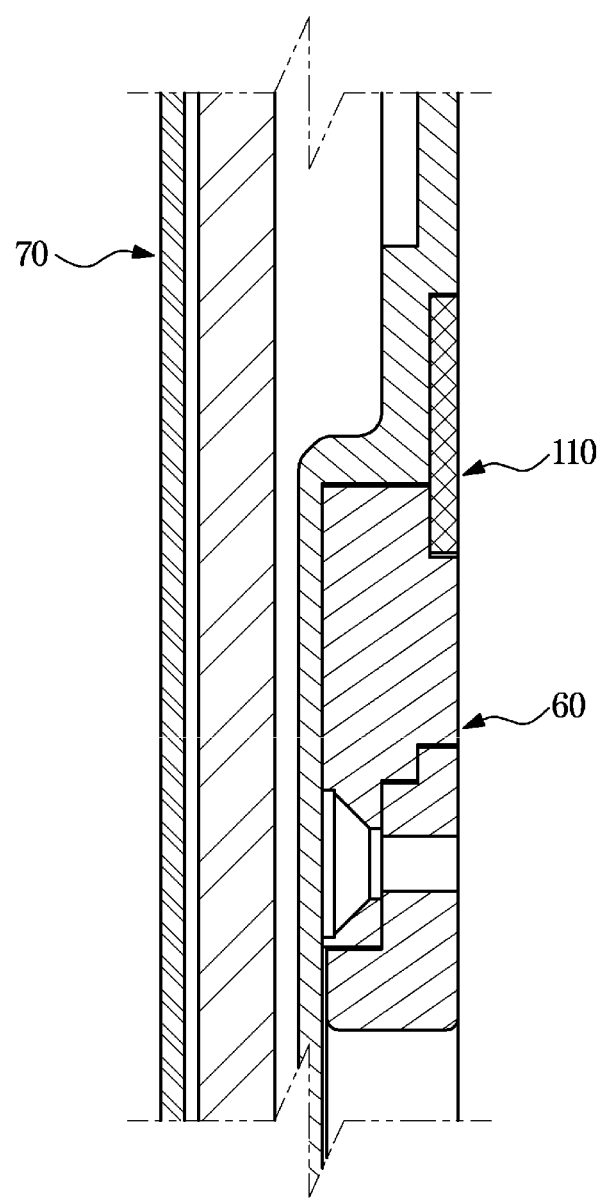
FIG. 20 is a cross-sectional view taken along line A-A of FIG. 19.
Figure 21:
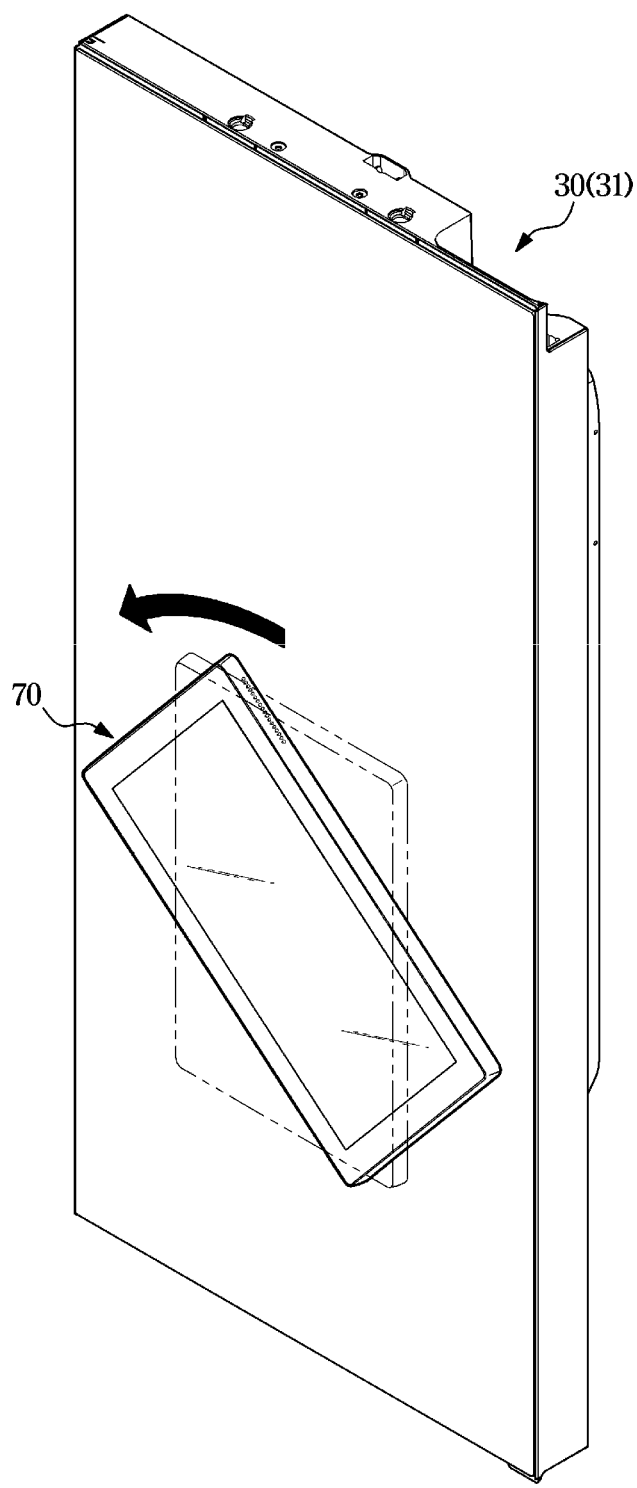
FIG. 21 illustrates that the display according to an embodiment of the disclosure is rotated in a first direction in a state of being positioned long in the vertical direction.
Figure 22:
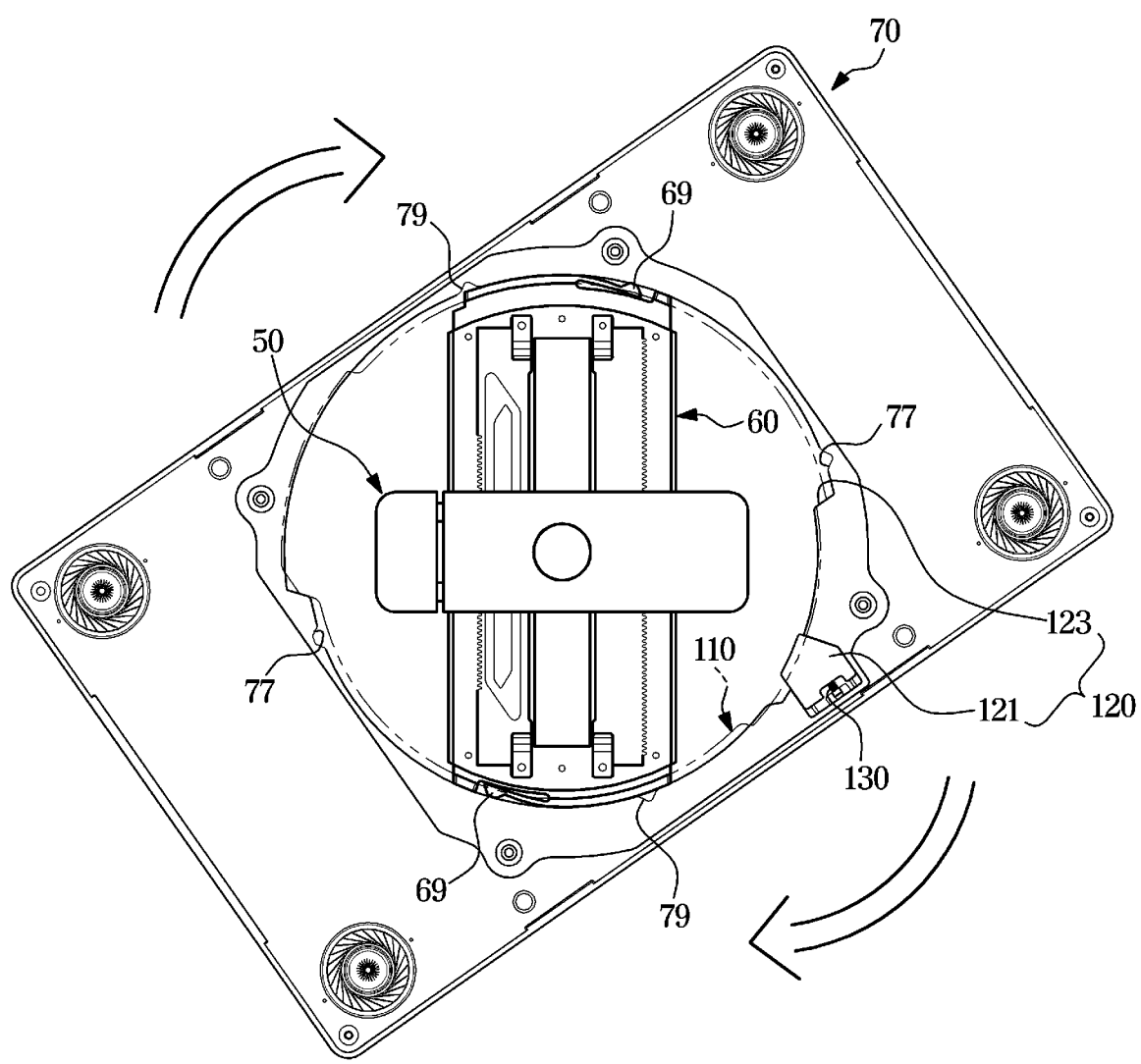
FIG. 22 is a rear view illustrating the display according to an embodiment of the disclosure being rotated in the first direction in a state of being positioned long in the vertical direction.
Figure 23:
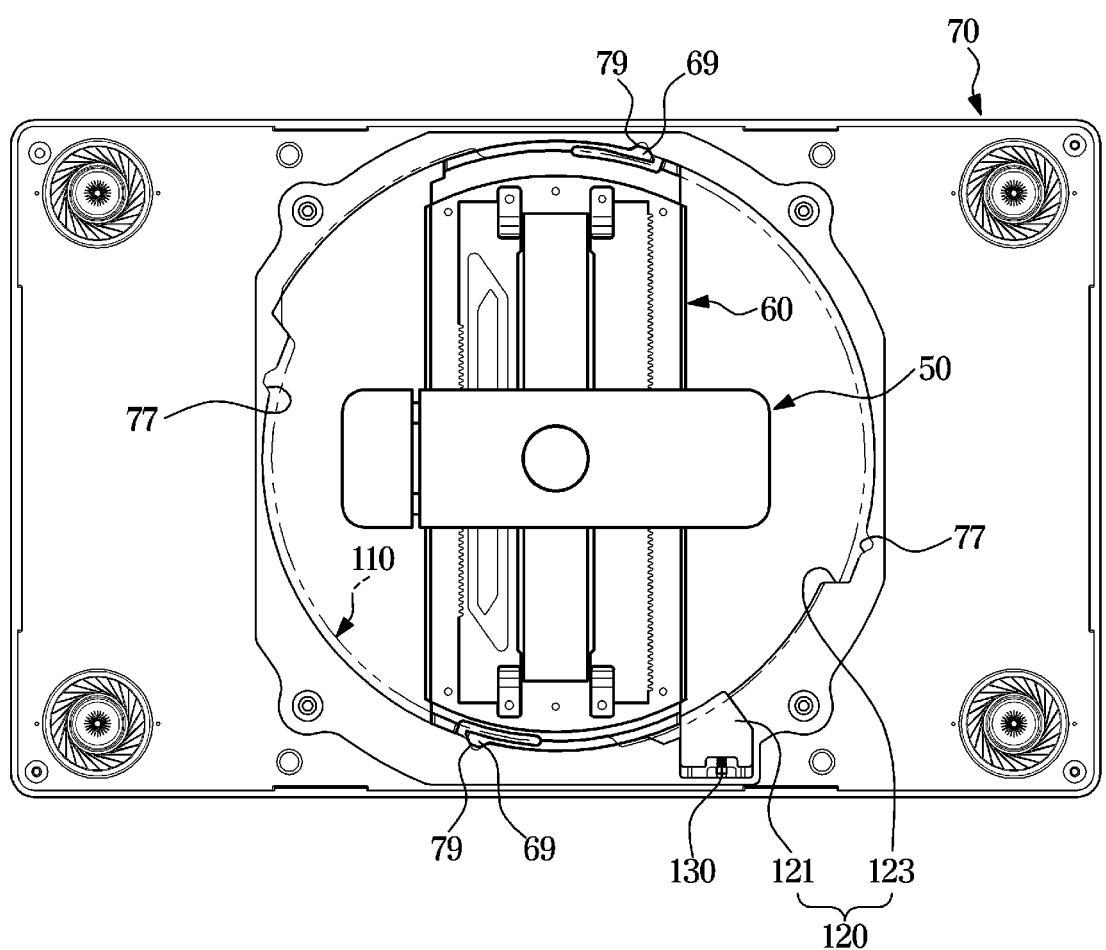
FIG. 23 is a rear view illustrating the display according to an embodiment of the disclosure being rotated to be positioned long in a horizontal direction.

FIG. 19 is a rear view illustrating the display according to an embodiment of the disclosure being positioned long in a vertical direction. FIG. 20 is a cross-sectional view taken along line A-A of FIG. 19. FIG. 21 illustrates that the display according to an embodiment of the disclosure is rotated in a first direction in a state of being positioned long in the vertical direction. FIG. 22 is a rear view illustrating the display according to an embodiment of the disclosure being rotated in the first direction in a state of being positioned long in the vertical direction. FIG. 23 is a rear view illustrating the display according to an embodiment of the disclosure being rotated to be positioned long in a horizontal direction.

As illustrated in FIG. 19, the rotation of the cover display 110 in the second direction may be limited as the rotation thereof is limited by the locking jaw 123 in a state where the display 70 is located long in the vertical direction. In this case, the pair of fixing portions 69 formed on the sliding plate 60 may be fixed to the pair of first fixing grooves 77 formed on the display 70. As illustrated in FIG. 20, because the cover display 110 is rotatably supported on the sliding plate 60, the cover display 110 may be prevented from being separated from the sliding plate 60.

In a state where the rotation of the cover display 110 in the second direction is limited by the locking jaw 123, the display 70 may be rotated in the first direction, as illustrated in FIG. 21. That is, as illustrated in FIG. 22, the cover display 110 fixed to the rear surface of the display 70 may be rotated in the first direction. At this time, the pair of fixing portions 69 formed on the sliding plate 60 may be released from the fixing in the pair of first fixing grooves 77 formed on the display 70. Because the cover display 110 is rotatably supported on the sliding plate 60, when the cover display 110 is rotated, the cover display 110 may be prevented from being separated from the sliding plate 60 (see FIG. 20).

As illustrated in FIG. 23, when the cover display 110 is rotated by 90 degrees in the first direction, the cover display 110 may be limited in rotation by the stopper 121. That is, when the rotation of the cover display 110 is prevented by the stopper 121, the display 70 may be in a state of being located long in the horizontal direction. In this case, the pair of fixing portions 69 formed on the sliding plate 60 may be fixed to the pair of second fixing grooves 79 formed on the display 70. Because the cover display 110 is rotatably supported on the sliding plate 60, the cover display 110 may be prevented from being separated from the sliding plate 60 (see FIG. 20).

That is, because the display 70 may be rotated only up to 90 degrees in the first or second direction, the display 70 may be fixed in a state where the display 70 is located long in the vertical or horizontal direction.

As is apparent from the above, according to embodiments of the disclosure, a height of a display can be manually adjusted, and at the same time the height of the display can be automatically fixed.

Further, a screen of the display can be switched horizontally and vertically, so that user convenience can be improved.

Further, the assembly and disassembly operations of the display are simplified, so that the work time required to assemble and disassemble the display can be shortened.

While the disclosure has been particularly described with reference to exemplary embodiments, it should be understood by those of skilled in the art that various changes in form and details may be made without departing from the spirit and scope of the disclosure.

What is claimed is:

1. A refrigerator comprising:
a main body;
a door coupled to a front surface of the main body;
a bracket coupled to a front surface of the door and comprising a roller;
a sliding plate supported on the roller of the bracket and to slide along a vertical direction;
a display supported on the sliding plate; and
a position fixing device configured to fix a position of the sliding plate,
wherein the position fixing device comprises:
a spur gear to couple to the bracket;
a rack gear to engage with the spur gear to allow a moving of the sliding plate; and
a stopper configured to prevent a rotation of the spur gear while being engaged with the rack gear when the moving of the sliding plate is stopped to thereby fix the position of the sliding plate.

2. The refrigerator according to claim 1, further comprising:
a rotation protrusion provided at a central portion of the spur gear to rotatably support the spur gear,
a slot provided on the bracket to rotatably accommodate one end of the rotation protrusion, and
a guide groove provided on the sliding plate to guide another end of the rotation protrusion to be moved along the vertical direction.

3. The refrigerator according to claim 2, wherein the slot comprises a first slot extending along the vertical direction and a second slot extending along a horizontal direction from an upper end of the first slot.

4. The refrigerator according to claim 3, wherein the rotation protrusion is located at a first position of the slot when the sliding plate is moved upward to an intersection of the first slot and the second slot, and the rotation protrusion is located at a second position of the slot when the sliding plate is moved downward to an end point of the second slot.

5. The refrigerator according to claim 4, wherein the stopper is provided at a lower end of the first slot that is a lower portion of the first position.

6. The refrigerator according to claim 5, wherein the guide groove comprises:
a first guide groove to guide the rotation protrusion when the sliding plate is moved upward,
a second groove to guide the rotation protrusion when the sliding plate is moved downward,
a third guide groove to connect a lower portion of the first guide groove and a lower portion of the second guide groove, and
a fourth guide groove to connect an upper portion of the first guide groove and an upper portion of the second guide groove.

7. The refrigerator according to claim 6, wherein the first guide groove is provided adjacent to the rack gear so that the spur gear is engaged with the rack gear when the rotation protrusion is guided through the first guide groove.

8. The refrigerator according to claim 7, wherein the first guide groove comprises a first section corresponding to the rack gear, and a second section positioned above the first section.

9. The refrigerator according to claim 8, wherein when the sliding plate is moved upward in a state of being maximally moved downward, the spur gear is moved from the second section to the first section and rotated counterclockwise about the rotation protrusion by being engaged with the rack gear in a state where one end of the rotation protrusion is located at the first position, and the other end of the rotation protrusion is guided along the first guide groove.

10. The refrigerator according to claim 9, wherein when the sliding plate is stopped in a process of being moved upward, the sliding plate is moved downward by a weight of the display, and the spur gear is moved downward along the first slot by being rotated clockwise about the rotation protrusion by the rack gear.

11. The refrigerator according to claim 10, wherein when the spur gear is moved downward along the first slot, the spur gear is engaged with the stopper so that the rotation of the spur gear in a clockwise direction about the rotation protrusion is prevented, and a movement of the rack gear engaged with the spur gear is stopped so that the position of the sliding plate is fixed.

12. The refrigerator according to claim 11, wherein when the sliding plate is moved upward again in a state where the position of the sliding plate is fixed, the spur gear is rotated in a counterclockwise direction about the rotation protrusion and separated from the stopper, and then moved upward along the first slot so that the rotation protrusion is moved to the first position.

13. The refrigerator according to claim 12, wherein when the sliding plate is maximally moved upward, one end of the rotation protrusion on the spur gear is moved from the first position to the second position, and the other end of the rotation protrusion is moved to the second guide groove through the third guide groove.

14. The refrigerator according to claim 13, wherein when the sliding plate is moved downward in a state of being maximally moved upward, the other end of the rotation protrusion is guided along the second guide groove in a state where one end of the rotation protrusion on the spur gear is positioned at the second position, and when the sliding plate is maximally moved downward, one end of the rotation protrusion on the spur gear is moved from the second position to the first position, and the other end of the rotation protrusion is moved to the first guide groove through the fourth guide groove.

15. The refrigerator according to claim 1, wherein the position fixing device further comprises a pair of fixing protrusions provided at upper and lower portions of the bracket, respectively, and a pair of fixing clips provided at upper and lower portions of the sliding plate, respectively, to be fixed to the pair of fixing protrusions when the sliding plate is maximally moved upward and downward, respectively.

16. A refrigerator comprising:
a main body;
a door coupled to a front surface of the main body;
a bracket coupled to a front surface of the door and comprising a roller;
a sliding plate supported on the roller of the bracket and to move along a vertical direction;
a display supported on the sliding plate to be moved along the vertical direction together with the sliding plate;
a spur gear rotatably provided on the bracket;
a rack gear provided on the sliding plate to engage with the spur gear and to be moved along the vertical direction together with the sliding plate; and
a stopper configured to prevent a rotation of the spur gear when the rack gear is moved downward to prevent the rack gear from being moved downward.

17. The refrigerator according to claim 16, further comprising:
a rotation protrusion provided at a central portion of the spur gear to rotatably support the spur gear, a slot provided on the bracket to rotatably accommodate one end of the rotation protrusion, and a guide groove provided on the sliding plate to guide another end of the rotation protrusion so that the sliding plate is moved along the vertical direction.

18. The refrigerator according to claim 17, wherein the guide groove is provided adjacent to the rack gear so that the spur gear is engaged with the rack gear when the rotation protrusion is guided through the guide groove.

19. The refrigerator according to claim 18, wherein the stopper is provided on the slot, when the sliding plate is moved upward in a state where the spur gear is engaged with the rack gear, the spur gear is spaced apart from the stopper so that the spur gear is rotated, and when the sliding plate is moved downward, the spur gear is engaged with the stopper so that the rotation of the spur gear is prevented.

20. The refrigerator according to claim 16, wherein the sliding plate comprises the rack gear provided on one of left and right sides of the sliding plate and a rack gear member provided on another side, and the bracket comprises a pinion gear engaged with the rack gear member and rotated.

* * * * *